(12) United States Patent
Apturkar et al.

(10) Patent No.: US 10,812,479 B2
(45) Date of Patent: Oct. 20, 2020

(54) AUTHENTICATING A USER VIA MULTIPLE BIOMETRIC INPUTS

(71) Applicant: FISERV, INC., Brookfield, WI (US)

(72) Inventors: Nishant Dilip Apturkar, Kolhapur (IN); Harshal Vilasrao Chitkuntalwar, Pune (IN)

(73) Assignee: FISERV, INC., Brookfield, WI (US)

( * ) Notice: Subject to any disclaimer, the term of this patent is extended or adjusted under 35 U.S.C. 154(b) by 217 days.

(21) Appl. No.: 16/210,560

(22) Filed: Dec. 5, 2018

(65) Prior Publication Data

US 2020/0186522 A1   Jun. 11, 2020

(51) Int. Cl.
*H04L 29/06* (2006.01)
*H04L 9/32* (2006.01)
*H04W 12/06* (2009.01)

(52) U.S. Cl.
CPC ........ *H04L 63/0861* (2013.01); *H04L 9/3231* (2013.01); *H04L 63/0884* (2013.01); *H04W 12/06* (2013.01)

(58) Field of Classification Search
CPC ........ H04L 63/0861; H04L 63/0884; H04L 9/3231
See application file for complete search history.

(56) References Cited

U.S. PATENT DOCUMENTS

| | | | |
|---|---|---|---|
| 5,291,560 A | 3/1994 | Daugman | |
| 6,154,879 A | 11/2000 | Pare, Jr. et al. | |
| 7,155,416 B2 | 12/2006 | Shatford | |
| 8,554,689 B2 | 10/2013 | Mardikar et al. | |
| 8,635,452 B2 | 1/2014 | Murray et al. | |
| 9,251,398 B2 | 2/2016 | Rosqvist | |
| 9,438,581 B2 | 9/2016 | Nairn | |
| 2002/0140542 A1 | 10/2002 | Prokoski et al. | |
| 2003/0182151 A1 | 9/2003 | Taslitz | |
| 2003/0182241 A1 | 9/2003 | Everhart | |
| 2004/0153417 A1 | 8/2004 | Everhart | |
| 2005/0143051 A1 | 6/2005 | Park | |
| 2005/0235148 A1* | 10/2005 | Scheidt | G06F 21/6245 713/168 |
| 2011/0087611 A1 | 4/2011 | Chetal | |
| 2013/0132091 A1* | 5/2013 | Skerpac | G07C 9/37 704/273 |
| 2013/0167208 A1 | 6/2013 | Shi | |
| 2013/0219479 A1 | 8/2013 | DeSoto et al. | |
| 2015/0302409 A1 | 10/2015 | Malek et al. | |
| 2015/0373019 A1 | 12/2015 | El Saddik et al. | |
| 2016/0328596 A1 | 11/2016 | Midgren et al. | |
| 2018/0068103 A1* | 3/2018 | Pitkanen | H04L 63/0861 |

FOREIGN PATENT DOCUMENTS

| | | |
|---|---|---|
| EP | 2849118 A4 | 3/2015 |
| WO | WO 1996/000485 A2 | 1/1996 |
| WO | WO 2008/052137 A3 | 5/2008 |

\* cited by examiner

*Primary Examiner* — Andrew J Steinle
(74) *Attorney, Agent, or Firm* — Alston & Bird LLP

(57) ABSTRACT

Example embodiments relate to authenticating a user operating a user computing entity. An input ordered sequence of biometric inputs is received and stored as profile templates. The templates are concatenated and a function is applied to generate a profile token. To authenticate a user, the same ordered sequence of biometric inputs are received to generate an authentication token with the profile token and the authentication token being compared for a match.

36 Claims, 18 Drawing Sheets

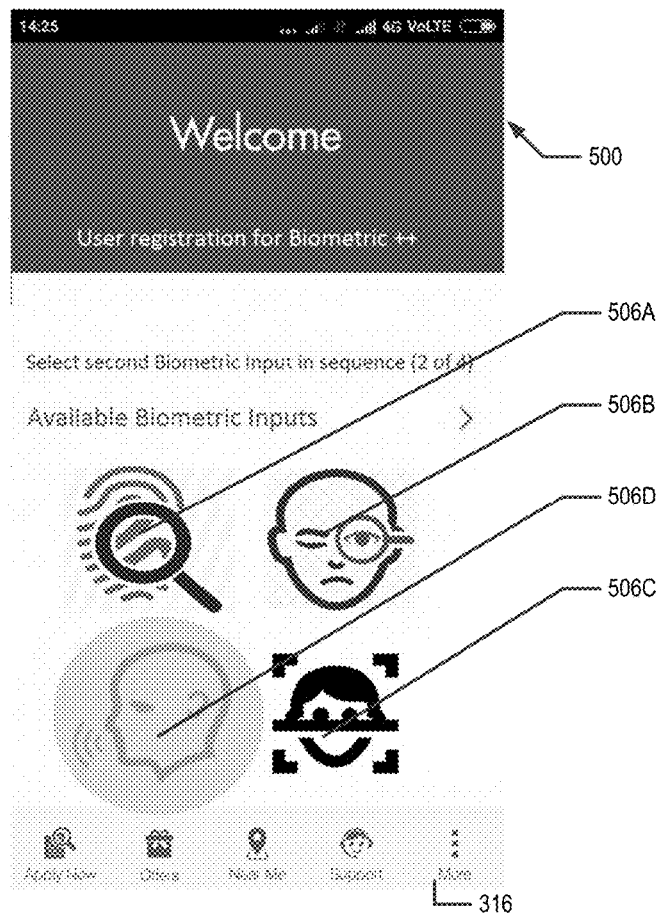
FIG. 5G
FIG. 5H
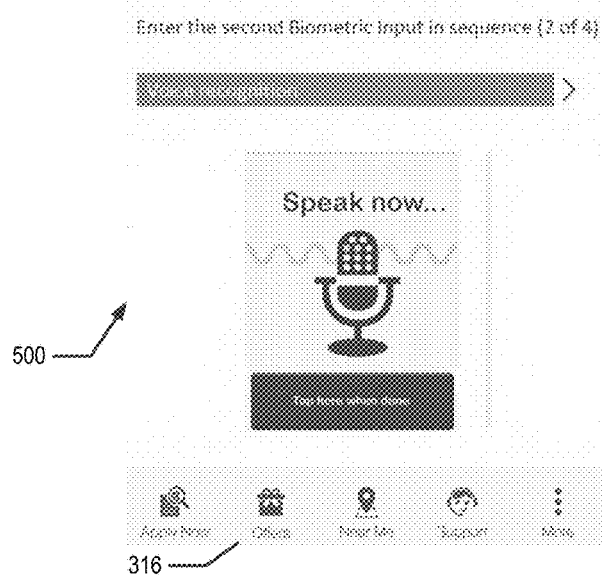

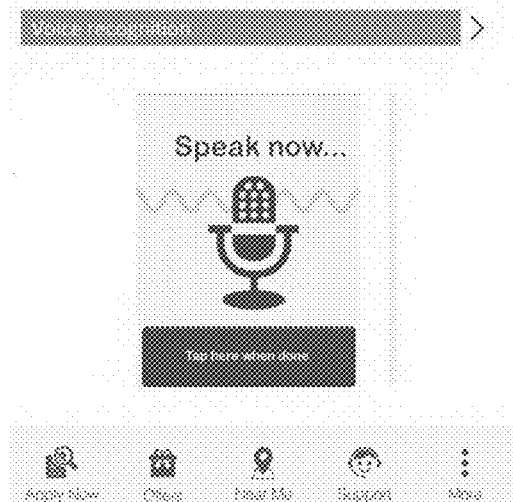
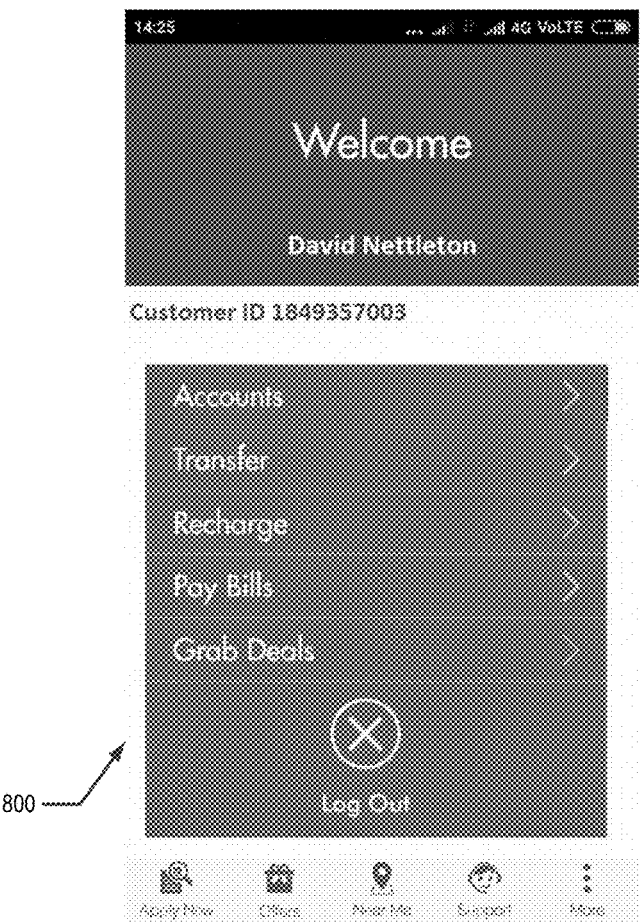
FIG. 8I
FIG. 8J

AUTHENTICATING A USER VIA MULTIPLE BIOMETRIC INPUTS

TECHNICAL FIELD

Various embodiments generally relate to user authentication. For example, an example embodiment relates to secure authentication of a user using a plurality of biometric inputs.

BACKGROUND

Traditional user authentication systems require a user to submit a user name or identifier and a passcode or personal identification number (PIN). However, such user authentication systems are vulnerable to hacking. For example, to gain access to a user account, a hacker may merely need to acquire or determine the passcode or PIN corresponding to the user account. Due to the vulnerabilities of passcode/PIN based user authentication systems, biometric authentication systems have been gaining in popularity. Biometrics are automated methods of identity verification or identification based on the principle of measurable physiological or behavioral characteristics such as a fingerprint, a palm print, an iris or retina pattern, facial structure, or a voice sample. Biometric characteristics are unique to an individual and not duplicable or transferable. However, biometric authentication systems may have a high false rejection rate.

BRIEF SUMMARY

Various embodiments provide a technical solution to the technical problem of performing user authentication in a reliable and secure manner.

In accordance with one aspect, a method is provided. In one embodiment, the method comprises receiving a first biometric input of an ordered sequence of biometric inputs from the user operating the user computing entity; extracting features of the first biometric input to generate a first authentication template, wherein the first authentication template comprises a first minimum positive feature vector; receiving a second biometric input of the ordered sequence of biometric inputs; and extracting features of the second biometric input to generate a second authentication template, wherein the second authentication template comprises a second minimum positive feature vector. The method also comprises determining that (a) the first authentication template matches a first profile template and (b) the second authentication template matches a second profile template; generating an authentication string by at least one of (a) concatenating the first authentication template and the second authentication template, or (b) concatenating the first profile template and the second profile template; generating an authentication token by applying a first function to the authentication string; and transmitting the authentication token to an authentication server.

In accordance with another aspect, a computer program product is provided. The computer program product may comprise at least one computer-readable storage medium having computer-readable program code portions stored therein, the computer-readable program code portions comprising executable portions configured to receive a first biometric input of an ordered sequence of biometric inputs from the user operating the user computing entity; extract features of the first biometric input to generate a first authentication template, wherein the first authentication template comprises a first minimum positive feature vector; receive a second biometric input of the ordered sequence of biometric inputs; and extract features of the second biometric input to generate a second authentication template, wherein the second authentication template comprises a second minimum positive feature vector. The computer-readable program code portions also comprise executable portions configured to determine that (a) the first authentication template matches a first profile template and (b) the second authentication template matches a second profile template; generate an authentication string by at least one of (a) concatenating the first authentication template and the second authentication template, or (b) concatenating the first profile template and the second profile template; generate an authentication token by applying a first function to the authentication string; and transmit the authentication token to an authentication server.

In accordance with yet another aspect, a system comprising at least one processor and at least one memory including computer program code is provided. In one embodiment, the at least one memory and the computer program code may be configured to, with the processor, cause the apparatus to receive a first biometric input of an ordered sequence of biometric inputs from the user operating the user computing entity; extract features of the first biometric input to generate a first authentication template, wherein the first authentication template comprises a first minimum positive feature vector; receive a second biometric input of the ordered sequence of biometric inputs; and extract features of the second biometric input to generate a second authentication template, wherein the second authentication template comprises a second minimum positive feature vector. The at least one memory and the computer program code may also be configured to, with the processor, cause the system to determine that (a) the first authentication template matches a first profile template and (b) the second authentication template matches a second profile template; generate an authentication string by at least one of (a) concatenating the first authentication template and the second authentication template, or (b) concatenating the first profile template and the second profile template; generate an authentication token by applying a first function to the authentication string; and transmit the authentication token to an authentication server.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4:
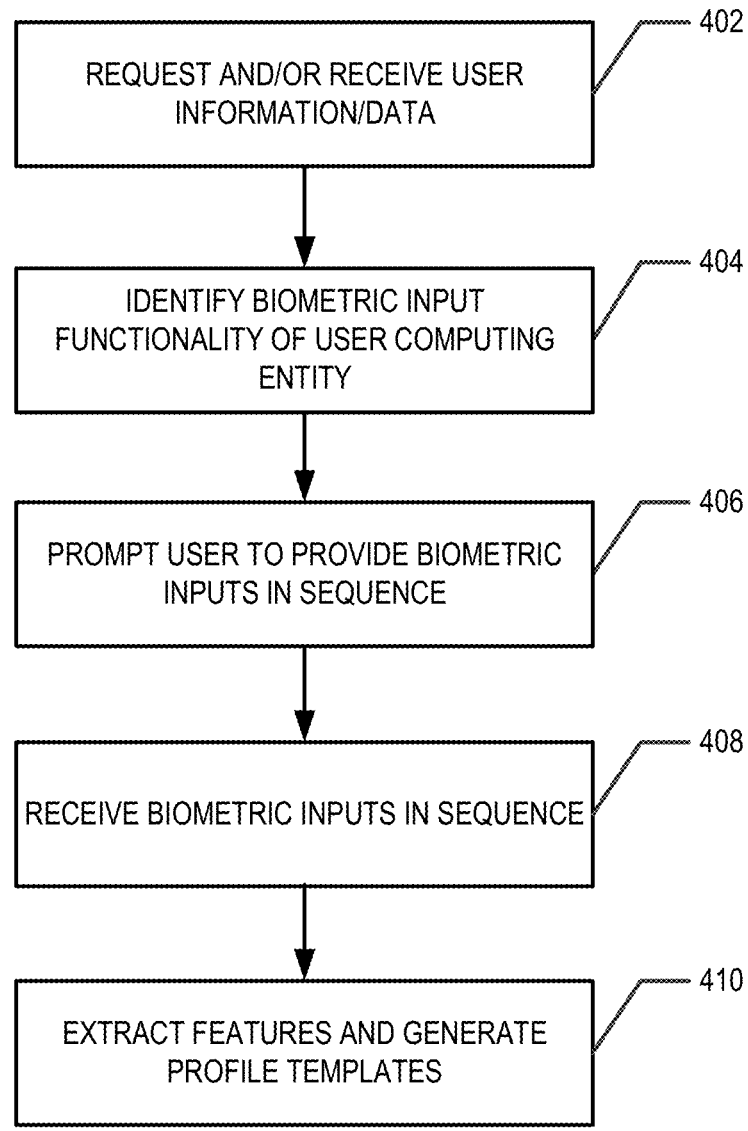
Figure 6:
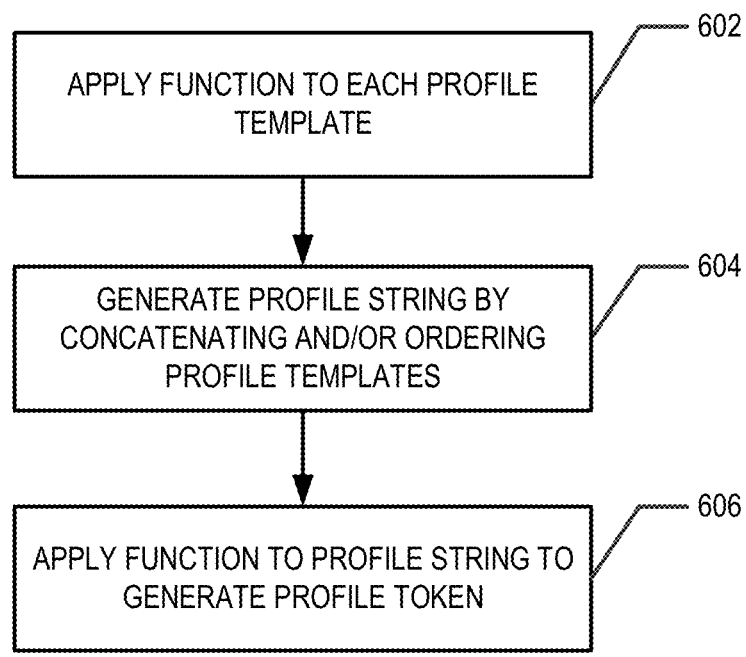
Figure 6A:
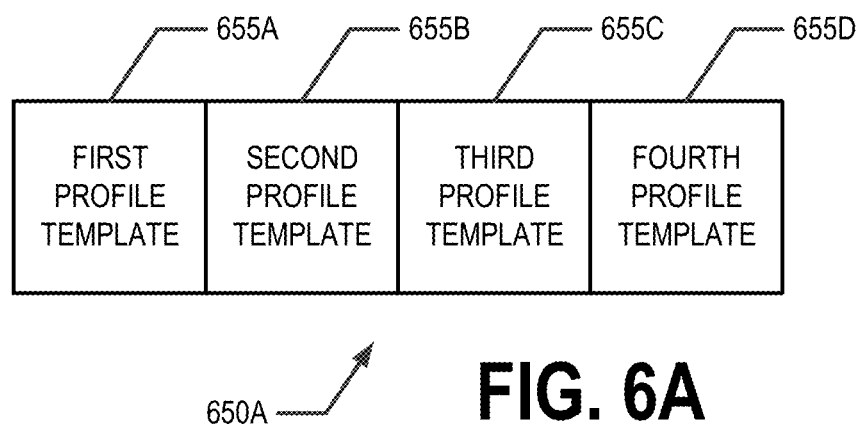
Figure 6B:
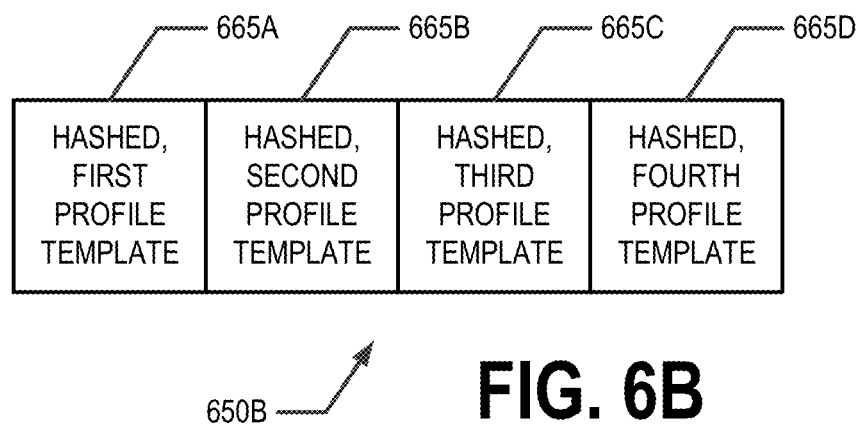
Figure 7:
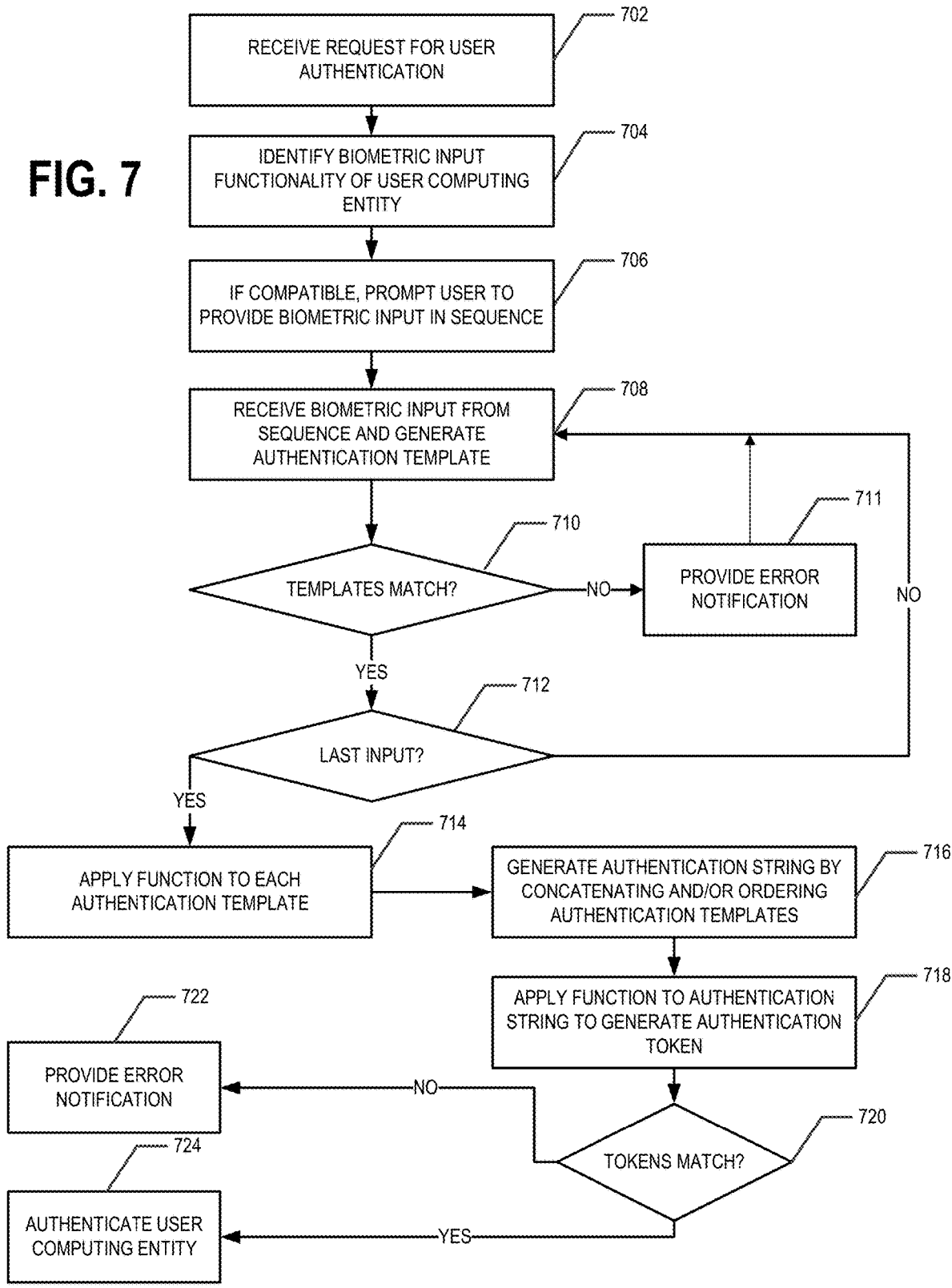
Figure 7A:
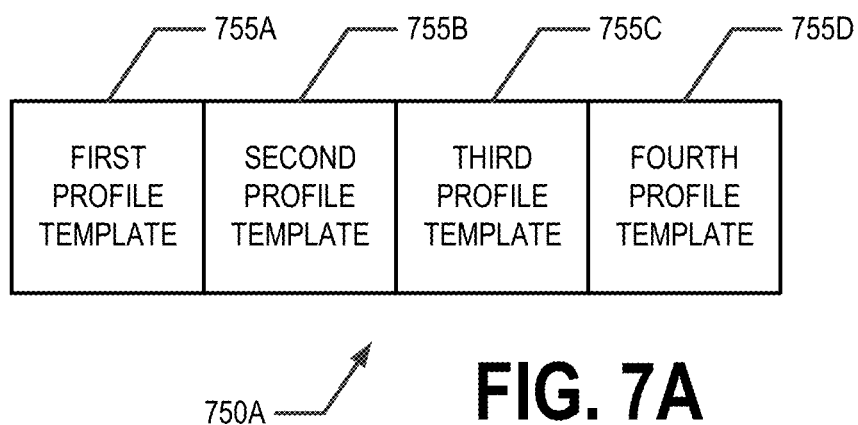
Figure 7B:
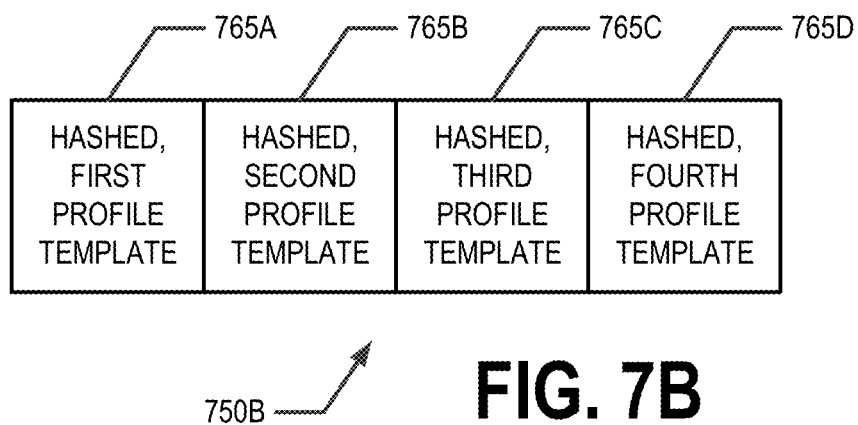

FIG. 4 provides a flowchart illustrating example steps, processes, procedures, and/or operations of registering biometric inputs for authentication, in accordance with an example embodiment of the present invention;

FIGS. 5A, 5B, 5C, 5D, 5E, 5F, 5G, 5H, and 5I each illustrate an example view of a user registration interface, in accordance with an example embodiment of the present invention;

FIG. 6 provides a flowchart illustrating example steps, processes, procedures, and/or operations for generating a profile token, in accordance with an example embodiment of the present invention;

FIGS. 6A and 6B are diagrams illustrating profile strings, in accordance with an example embodiment of the present invention;

FIG. 7 provides a flowchart illustrating example steps, processes, procedures, and/or operations for authenticating a user using an authentication token, in accordance with an example embodiment of the present invention;

FIGS. 7A and 7B are diagrams illustrating authentication strings, in accordance with an example embodiment of the present invention; and FIGS. 8A, 8B, 8C, 8D, 8E, 8F, 8G, 8H, 8I, and 8J each illustrate an example view of a user authentication interface, in accordance with an example embodiment of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Devices

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, and/or the like. As such, embodiments of the present invention may take the form of a data structure, apparatus, system, computing device, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

Figure 1:
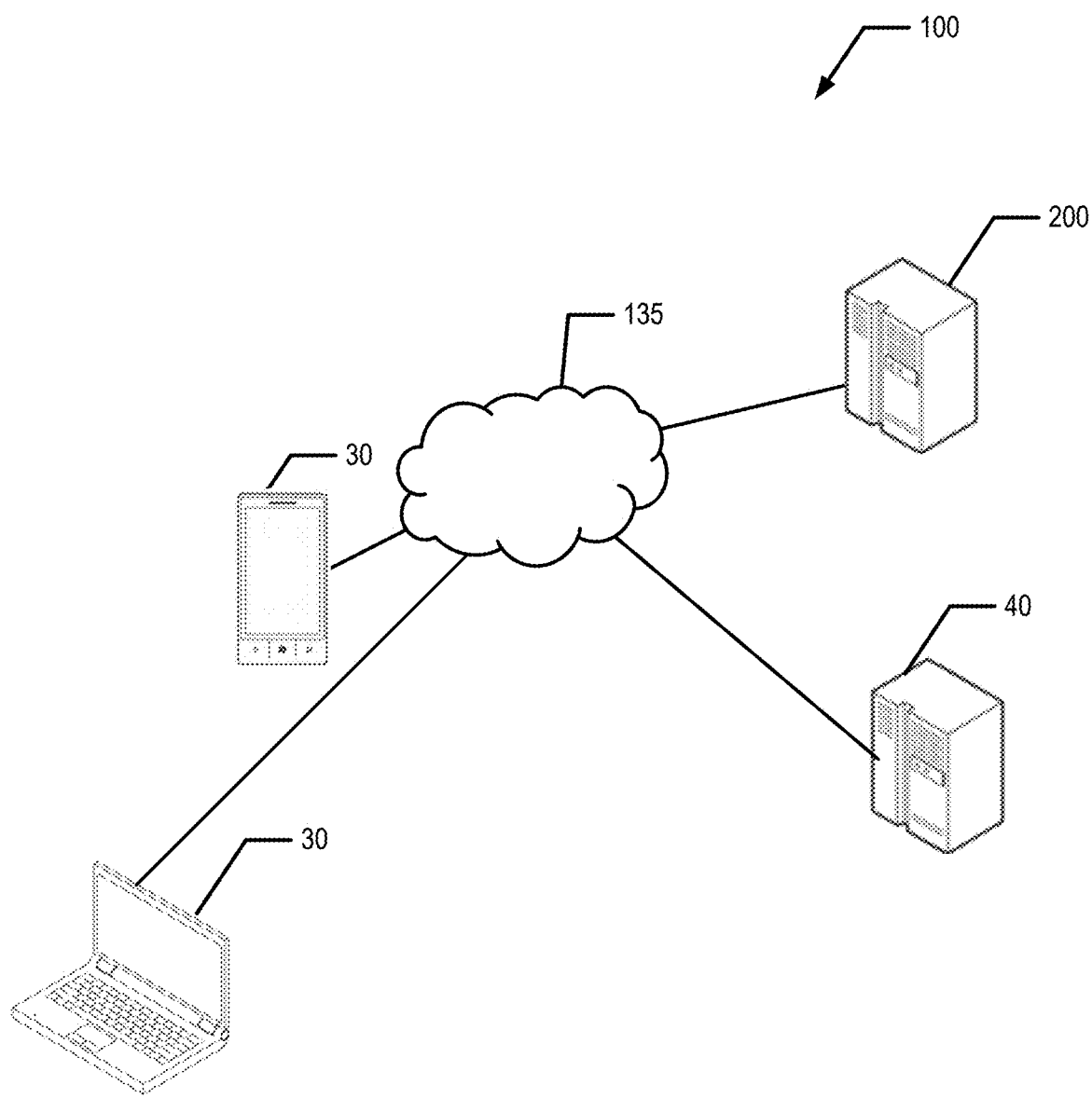
FIG. 1 is a diagram of a system that can be used to practice various embodiments of the present invention.

FIG. 1 provides an illustration of an environment 100 that can be used in conjunction with various embodiments of the present invention. As shown in FIG. 1, the environment 100 may comprise one or more authentication computing entities 200, one or more user computing entities 30, one or more content computing entities 40, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrate certain system devices as separate, standalone devices, the various embodiments are not limited to this particular architecture.

a. Exemplary Authentication Computing Entity

Figure 2:
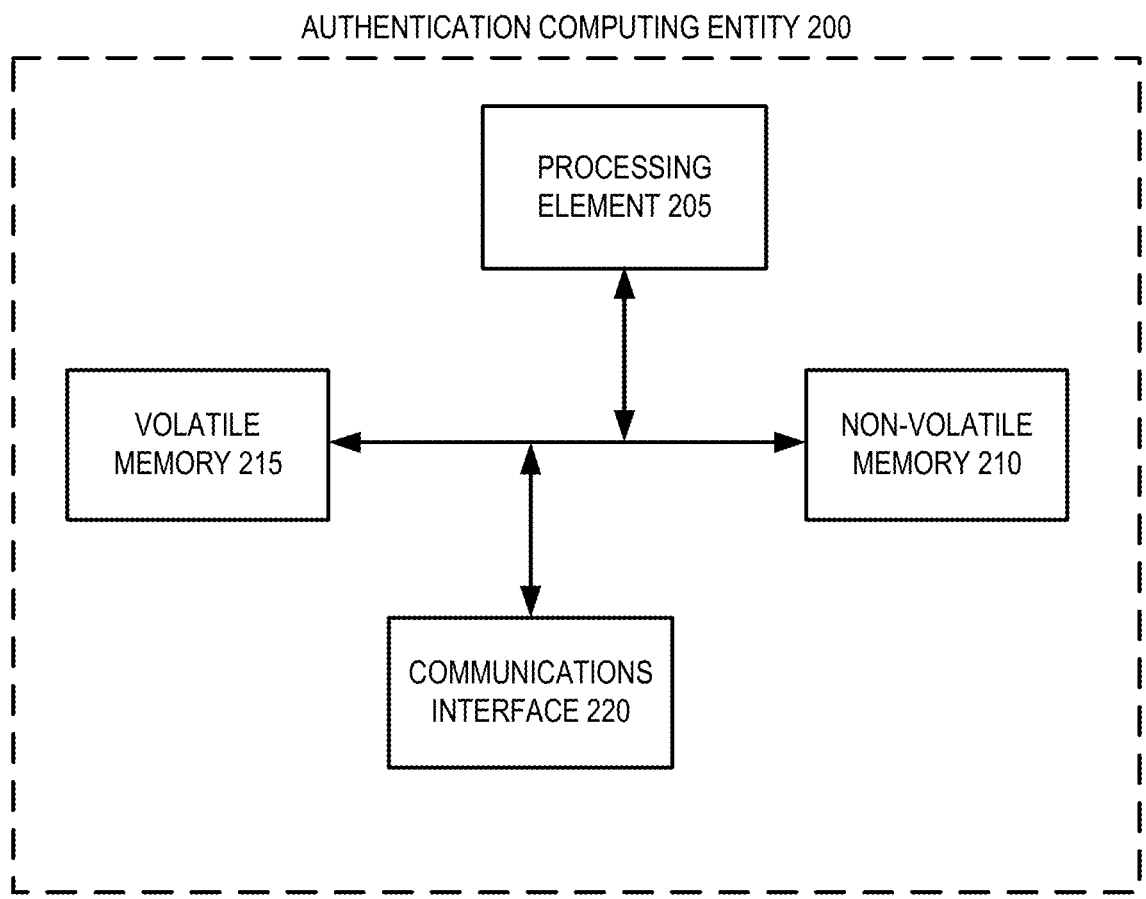
FIG. 2 is a schematic of an authentication computing entity in accordance with certain embodiments of the present invention.

FIG. 2 provides a schematic of an authentication computing entity 200 according to one embodiment of the present invention. In general, the terms computing device, device, system, and/or similar words used herein interchangeably may refer to, for example, one or more computers, computing devices, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. In an example embodiment, the authentication computing entity 200 is a computing entity or device (e.g., a server) configured to provide one or more secure functions to a user via the user computing entity 30. In an example embodiment, the authentication computing entity 200 may be configured to request and/or receive one or more user computing entity authentication requests (e.g., via the network 135), store a plurality of user profiles, store information/data corresponding to a plurality of user accounts, provide secure access to one or more websites, and/or the like. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the authentication computing entity 200 may also include one or more network and/or communications interfaces 220 for communicating with various computing devices, such as by communicating data, content, information, and/or similar terms used herein interchangeably that can be transmitted, received, operated on, processed, displayed, stored, and/or the like. For instance, the authentication computing entity 200 may communicate with one or more content computing entities 40, one or more user computing entities 30, and/or the like.

As shown in FIG. 2, in one embodiment, the authentication computing entity 200 may include or be in communication with one or more processing elements 205 (also referred to as processors, processing circuitry, and/or similar terms used herein interchangeably) that communicate with other elements within the authentication computing entity 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing devices, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the authentication computing entity 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the authentication computing entity 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the authentication computing entity 200 with the assistance of the processing element 205 and the operating system.

As indicated, in one embodiment, the authentication computing entity 200 may also include one or more network and/or communications interfaces 220 for communicating with various computing devices, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, authentication computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The authentication computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the authentication computing entity's 200 components may be located remotely from other authentication computing entity 200 components, such as in a distributed system. Furthermore, one or more of the components may be aggregated and additional components performing functions described herein may be included in the authentication computing entity 200. Thus, the authentication computing entity 200 can be adapted to accommodate a variety of needs and circumstances, such as including various components described with regard to the user computing entity 30—including various input/output interfaces.

b. Exemplary User Computing Entity

Figure 3:
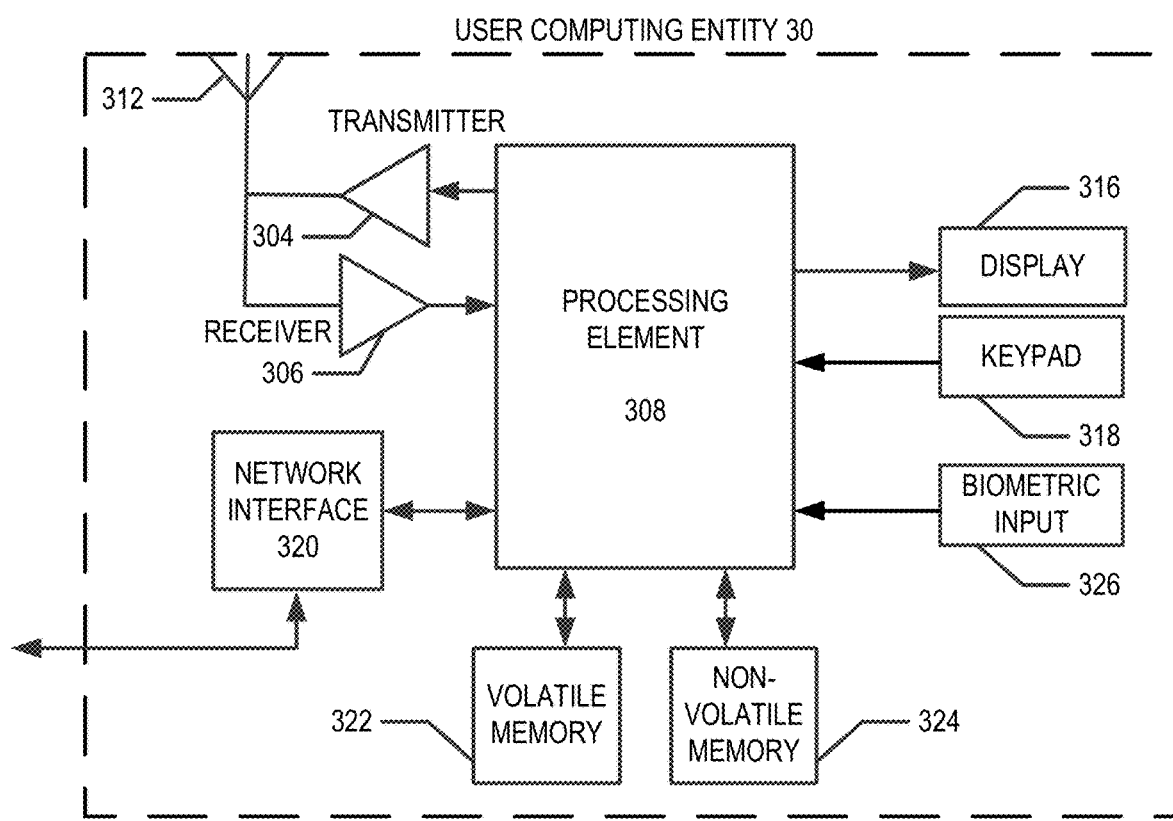
FIG. 3 is a schematic of a user computing entity in accordance with certain embodiments of the present invention.

FIG. 3 provides an illustrative schematic representative of user computing entity 30 that can be used in conjunction with embodiments of the present invention. In various embodiments, the user computing entity 30 may be any mobile device and/or computing device comprising and/or in communication with a biometric input component/element 326 that is configured to receive one or more biometric inputs (e.g., a fingerprint scanner, hand print scanner, palm print scanner, microphone for use in voice recognition, camera for use in iris/retina, facial recognition, vein pattern recognition, signature recognition, hand geometry) and providing biometric inputs and/or indications thereof to an authentication computing entity 200 via one or more wired and/or wireless networks. For example, a user computing entity 30 may be a smart phone, wearable device (e.g., smart glasses, smart watch, fob, RFID key card, Fitbit, and/or the like), tablet, personal computer, laptop, automated teller machine (ATM), point-of-sale (POS) system, and/or the like.

As shown in FIG. 3, a user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various devices, such as an authentication computing entity 200, another user computing entity 30, and/or the like. In an example embodiment, the transmitter 304 and/or receiver 306 are configured to communicate via one or more SRC protocols. For example, the transmitter 304 and/or receiver 306 may be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna 312, transmitter 304, and receiver 306 may be configured to communicate via one or more long range protocols, such as GPRS, UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, and/or the like.

In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other devices using concepts such as Unstructured Supplementary Service information/data (USSD), Short Message Service (SMS), Multimedia Messaging Service (MIMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the user computing entity's 30 position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, NFC transmitters, and/or the like. These indoor positioning aspects can be used in a variety of settings to determine the location of someone or something to within inches or centimeters.

The user computing entity 30 may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user interface may be configured to provide an application, browser, interactive user interface, dashboard, webpage, and/or similar words used herein interchangeably executing on and/or accessible via the user computing entity 30 to cause display or audible presentation of information/data and for user interaction therewith via one or more user input interfaces. In one embodiment, the functionality described herein (and user interface) may be provided as a standalone app executing on the user computing entity 30. In such an implementation, the standalone app may be integrated with a variety of other apps executing on the user computing entity 30 to provide authentication functionality for other apps. In another implementation, the functionality described herein (and user interface) may be provided as part of or as the authentication functionality of an app executing on the user computing entity 30. Moreover, the user interface can comprise or be in communication with any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

In various example embodiments, the user computing entity 30 may comprise one or more biometric input components/elements 326 for receiving various biometric input from the user operating the user computing entity 30. For example, the user computing entity 30 may comprise a touch sensitive region and/or display for capturing a fingerprint scan, in an example embodiment. In another example, the user computing entity 30 may comprise a camera and/or image capturing device for capturing one or more images for performing iris and/or face authentication. In another example, the user computing entity 30 may comprise a microphone for capturing a voice sample for voice recognition. As should be understood, the user computing entity 30 may comprise various biometric input components/elements 326 for receiving biometric input from a user operating the user computing entity 30 and that may be used for authenticating the user.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Content Computing Entity

In various embodiments, the environment 100 further comprises one or more content computing entities 40 configured to communicate with one or more user computing entities 30, authentication computing entities 200, and/or other computing entities via one or more wired and/or wireless networks 135. In an example embodiment, the content computing entity 40 is a server, computing entity, and/or computing device configured to provide application functionality, provide access to content, store and provide one or more websites and/or website information/data of a website, provide one or more services, and/or a combination thereof such that information/data, content, application(s), service(s), and/or other functionality may be provided to a user via a user computing entity 30 after authentication of the user via the user computing entity 30 and the authentication computing entity 200. In an example embodiment, at least one of the one or more content computing entities 40 may also perform one or more functions described as being performed by the authentication computing entity 200 herein. In an example embodiment, the content computing entity 40 comprises one or more elements similar to those described above with respect to authentication computing entity 200 and/or user computing entity 30. For example, various embodiments, the content computing entity 40 comprises one or more processing elements and/or processing devices, volatile and/or non-volatile memory, communication and/or network interfaces, and/or the like.

d. Exemplary Networks

In one embodiment, any two or more of the illustrative components of the architecture of FIG. 1 may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. Brief Overview

In various embodiments, methods, systems, apparatuses, computer program products, and/or the like are provided for improved authentication. One technical problem with biometric authentication techniques is high false negative rates. Example embodiments provide a technical solution to the problem of high false negative rates while providing a secure authentication process. To do so, multiple biometric inputs are used to compensate for the need to retain a high accuracy threshold for a single biometric input. Instead of requiring high accuracy for a single biometric input, by using multiple biometric inputs, the individual accuracy thresholds can be lowered to reduce the false rejection rates. For instance, in a standard system, a single biometric authentication may require an 80% accuracy match to be authenticated. However, using a biometric token generated from multiple biometric inputs, the accuracy match for each input may be lowered to, for example, a 60% accuracy match for each input because multiple inputs are verified. In other words, the multiple biometric inputs compensate for the need to retain a high threshold for accuracy, and authentication based only on a specific combination for a user will further enhance security in such an implementation.

In such a system, a user may register a sequence of biometric inputs. For example, a user may complete a registration process that includes providing a sequence of N biometric inputs. In an example described herein, a user may provide a sequence of four biometric inputs (e.g., left thumbprint, voice recognition, facial recognition, and right index fingerprint or iris recognition, left thumbprint, right index fingerprint, and left thumbprint, right palm print, and/or the like). In various embodiments, the user provides the sequence of biometric inputs via the user computing entity. Each biometric input is stored as a profile template and associated with a sequence position in the biometric authentication sequence. For example, the first provided biometric input may be associated with a first sequence position corresponding to the beginning of the sequence, a second provided biometric input may be associated with a second sequence position corresponding to a second position within the sequence, and/or so on.

The user computing entity provides the sequence of biometric inputs (and/or an indication thereof, such as a feature vector extracted from each biometric input of the sequence) such that an authentication computing entity receives the sequence of biometric inputs. The authentication computing entity generates a profile template for each of the biometric inputs of the sequence. A template is a digital representation of the unique features that have been extracted from a biometric input (e.g., using feature extraction). The templates are stored in association with a user identifier corresponding to the user in a user profile database (e.g., as part of a user profile corresponding to the user) as profile templates. Optionally, the authentication computing entity can apply a function (e.g., hashing function, encoding, encryption, cryptographic algorithm, and/or the like) to each profile template. Then, the authentication computing entity can generate a profile string of sequential inputs from the hashed or cryptographic profile templates (e.g., concatenate the hashed or cryptographic profile templates) by positioning the hashed or cryptographic profile templates in an order corresponding to the sequence positions associated with the biometric input sequence. For example, the hashed or cryptographic profile template generated from a biometric input associated with a first sequence position is positioned as the first hashed or cryptographic template in the profile string and so on. The authentication computing entity then generates a profile token (e.g., a biometric combination token/code) by applying a hashing function, encoding, encryption, cryptographic algorithm, and/or the like on the profile string. A profile token object is then generated based on the profile token and stored in association with the user profile as a profile token object. In an example embodiment, the profile token object is a data object and/or structure comprising the profile token.

After completing the registration process, when a user wishes to access information/data, content, applications, functions, and/or the like (e.g., via the user computing entity) that require biometric authentication, the user may provide the sequence of biometric inputs as the form of authentication. In particular, the user provides a sequence of biometric inputs that corresponds to the sequence of biometric inputs provided during the registration process. In this example, an authentication template is generated from each biometric input of the authentication process. Each authentication template is then compared to the corresponding profile template to evaluate the similarity of each template pair. To make such an evaluation, the authentication template and the corresponding profile template need to satisfy a first similarity threshold requirement. For example, the profile template comprises a profile feature vector that is extracted during the registration process, and an authentication templates comprises an authentication feature vector that is extracted during the authentication process. Feature vectors are digital representations of key characteristics of a particular biometric input. In an example embodiment, the profile feature vector is a minimum positive feature vector (e.g., the minimum number of features required to have a positive match), and the authentication feature vector is a minimum positive feature vector. Minimum positive feature vectors are a measurable output for a feature extraction process that can be used for comparison between a profile template (e.g., profile feature vector) and an authentication template (e.g., authentication feature vector). Because a biometric match might not be an exact match, the minimum feature vector defines a measure of similarity at which a match may be declared positive (e.g., 80% vs. 60%). The feature vectors that satisfy the first threshold are deemed a match. The process iterates for each authentication template.

Responsive to determining that each authentication template of the sequence matches the corresponding profile template (e.g., satisfies a corresponding threshold), the user computing entity can apply the hashing function, encoding, encryption, cryptographic algorithm, and/or the like on each authentication template. As will be recognized, this is the same hashing function, encoding, encryption, cryptographic algorithm, and/or the like used during the registration process. Then, the user computing entity can generate an authentication string of sequential inputs from the hashed or cryptographic authentication templates (e.g., concatenate the hashed or cryptographic authentication templates) by positioning the hashed or cryptographic authentication templates in an order corresponding to the sequence positions associated with the biometric inputs corresponding to the authentication templates. Once properly positioned, the user computing entity generates an authentication token by applying a hashing function, encoding, encryption, cryptographic algorithm, and/or the like on the authentication string. The authentication token is compared to the profile token to determine if authentication token matches the profile token. In an example embodiment, the authentication token matches the profile token if the authentication token and the profile token and/or portions thereof satisfy a second similarity threshold requirement. Responsive to determining that the authentication token matches the profile token, the user is authenticated and the user computing entity is permitted to access information/data, content, applications, functions, and/or the like in accordance with the permissions associated with the user profile corresponding to the provided user identifier. In an example embodiment, the information/data, content, applications, functions, and/or the like are provided by a content computing entity.

As will be recognized, the user computing entity 30 used to complete the registration need not be the same user computing entity 30 that the user operates to access the information/data, content, applications, functions, and/or the like in accordance with the permissions associated with the user profile corresponding to the user. For example, the user may perform the registration process using a personal mobile phone, tablet, and/or the like and use the biometric token-based authentication process to log in and/or be authenticated and/or authorized via an automated teller machine (ATM), point-of-sale (POS) system at a retailer, and/or the like. Various embodiments of the present invention may be implemented in various applications where a two-factor authentication process (e.g., a login followed by a one-time password (OTP) or a PIN) is traditionally used or applications that traditionally have a dual requirement of authentication (identity verification) and authorization (permissions), to simplify the authentication and authorization of a user via a single profile token. For example, various embodiments of the present invention may be used to authenticate and authorize a user to perform financial transactions (e.g., fund transfers, payments, and/or the like), access a secure user interface, access an ATM and/or make POS payments possibly without the use of a debit or credit card, and/or the like.

Thus, example embodiments provide a technical solution to various problems with biometric authentication and/or other forms of user authentication that provides for improved authentication of a user operating a user computing entity to reduce the false rejection rates of single biometric inputs.

IV. Exemplary Operation

Reference will now be made to FIGS. 4, 5A, 5B, 5C, 5D, 5E, 5F, 5G, 5H, 5I, 6, 6A, 7, 7A, 7B, 8A, 8B, 8C, 8D, 8E, 8F, 8G, 8H, 8I, and 8J. FIG. 4 provides a flowchart illustrating example steps, processes, procedures, and/or operations for registering biometric inputs for authentication. FIGS. 5A, 5B, 5C, 5D, 5E, 5F, 5G, 5H, and 5I each illustrate an example view of a user registration interface. FIG. 6 provides a flowchart illustrating example steps, processes, procedures, and/or operations for generating profile token, which may be part of the registration process in some embodiments. FIGS. 6A and 6B are diagrams illustrating profile strings. FIG. 7 provides a flowchart illustrating example steps, processes, procedures, and/or operations for authenticating a user using an authentication token. FIGS. 7A and 7B are diagrams illustrating authentication strings. And FIGS. 8A, 8B, 8C, 8D, 8E, 8F, 8G, 8H, 8I, and 8J each illustrate an example view of a user authentication interface.

a. Exemplary Registration Process

FIGS. 4 and/or 6 provide flowcharts illustrating example steps, processes, procedures, and/or operations performed by an appropriate computing entity (e.g., an authentication computing entity 200, user computing entity 30, and or another appropriate computing entity) or computing entities for registering a user for authentication via a biometric token-based authentication approach. In an example embodiment, a user profile corresponding to the user may already exist and be stored in a user profile database and/or the like stored by the authentication computing entity 200, content computing entity 40, and/or the like. For example, a user identifier configured to uniquely identify the user profile may already have been established and user information/data corresponding to the user may be stored in association with the user identifier. In an example embodiment, it is not necessary for a user profile to already exist prior to the registration process for biometric token-based authentication. For example, the registration process may comprise generating a user profile, generating a user identifier, receiving information/data corresponding to the user, storing the information/data corresponding to the user in association with the user identifier, and/or the like.

Starting at step/operation 402, responsive to receiving a request to register for biometric token-based authentication, the user computing entity 30 may request and receive user information/data from the user for the authentication process. For example, the user computing entity 30 via the user interface 500 may request a user identifier or user name of a user. In an example embodiment, if a user profile corresponding to the user and associated with a user identifier already exists (e.g., is stored in a user profile database stored by the authentication computing entity 200, content computing entity 40, and/or the like), the user information/data may comprise the user identifier and possibly a user passcode, password, PIN, and/or the like. In an example embodiment, if a user profile corresponding to the user does not already exist, the user information/data may comprise information/data identifying the user (e.g., user name, birthdate, and/or the like), user contact information/data (e.g., electronic destination address, email, instant messenger and/or social media username, phone number, mailing address, and/or the like), and/or other information/data relevant to the application (e.g., user account number, user affiliation, user title or role, and/or the like). In various embodiments, the user computing entity 30 receives the user identifier and via one or more user interfaces thereof and can provide the same to the authentication computing entity 200.

Figure 5A:
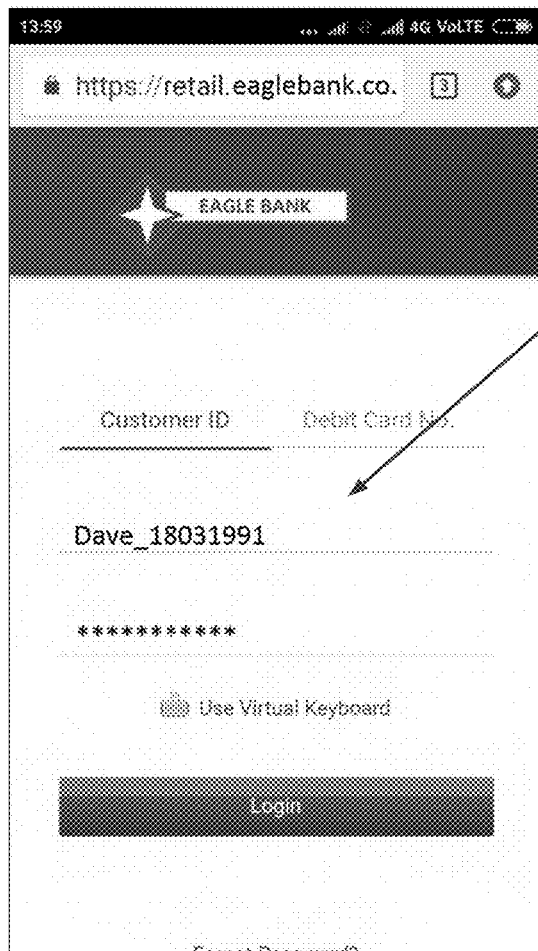
Figure 5B:

For example, a user may access the user interface 500 via the user computing entity 30, as shown in FIG. 5A. The user may enter (e.g., using keypad or keyboard 318) user information/data via one or more entry fields of the user interface 500. In the illustrated embodiment, the user provides user information/data comprising a username and password for a pre-established user profile corresponding to the user (502 of FIG. 5). After providing the user information/data, the user is provided with the user interface 500 illustrated in FIG. 5B. Through this user interface 500, the user may select a registration request indicator (e.g., icon, image, menu, button, graphic, and/or the like) 504 provided using a user input component/element of the user computing entity 30 (e.g., a touch screen in the illustrated embodiment). Responsive to receiving the user input selecting the registration request indicator 504, the user computing entity 30 may provide a registration request and the user information/data (e.g., at least a user identifier) such that the request and the user information/data (e.g., at least the user identifier) are received by the authentication computing entity 200.

Continuing with FIG. 4, at step/operation 404, responsive to receiving the request for registering for authentication, the biometric input components/elements 326 of the user computing entity 30 may be identified. In an example embodiment, an application and/or computer-readable code installed and/or operating on the user computing entity 30 may determine/identify the biometric input components/elements 326 of the user computing entity 30. In an example embodiment, an application and/or computer-readable code installed and/or operating on the authentication computing entity 200 may interact with the user computing entity 30 via an API to determine the biometric input components/elements 326 of the user computing entity 30. In another embodiment, a device profile (e.g., using a device identifier) of the user computing entity may be accessed to provide information/data identifying the biometric input components/elements 326 of the user computing entity 30. In these examples, the authentication computing entity 200 receives the information/data identifying the biometric input components/elements 326 of the user computing entity 30. For example, it may be determined that the user computing entity 30 has a fingerprint scanner, a microphone for capturing a voice sample, a camera capable of performing an iris and/or facial scan, and/or other biometric input component/element 326.

Figure 5C:
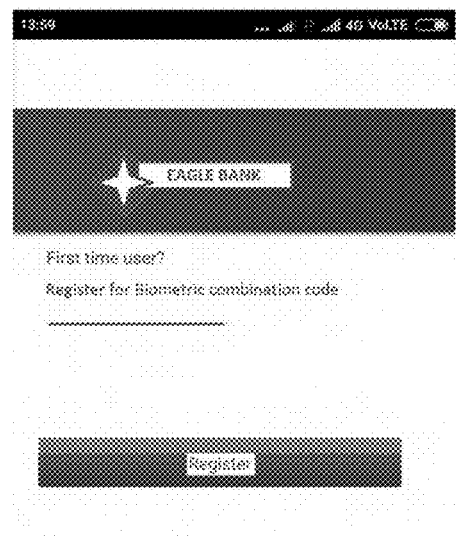
Figure 5D:
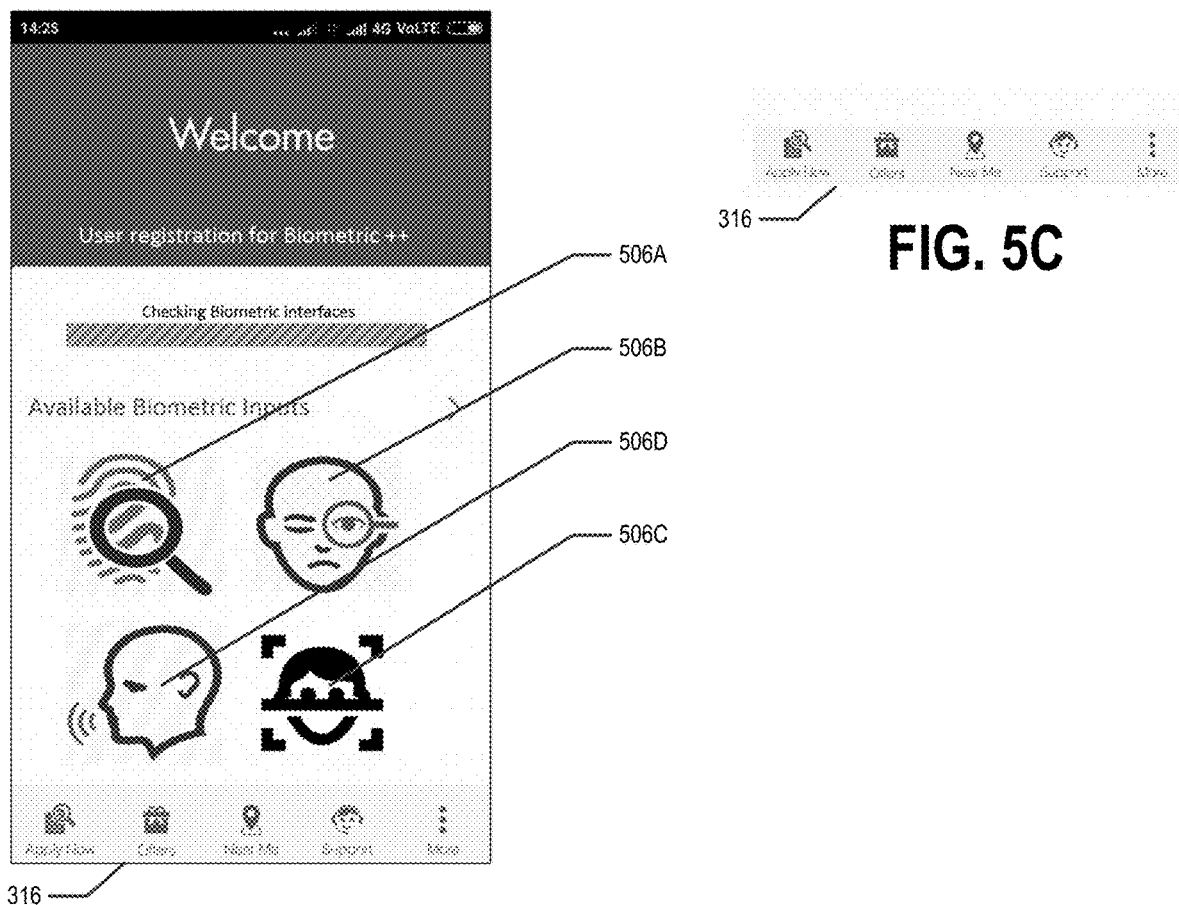

FIGS. 5C and 5D illustrate example views of a landing interface of user interface 500 for registering first time users. FIG. 5D also shows the user interface 500 providing the progress as the biometric input components/elements 326 of the user computing entity 30 are being determined/identified at step/operation 404. For example, an indicator 506 (e.g., 506A, 506B, 506C, 506D) may be displayed via the user interface 500 for each determined/identified biometric input component/element 326 and/or for each type of biometric input for which a corresponding biometric input component/element 326 has been determined/identified. For example, indicator 506A represents a fingerprint scan enabled by a biometric input component/element 326 capable of performing and/or capturing a fingerprint scan. In another example, indicator 506B represents an iris scan enabled by a biometric input component/element 326 capable of performing and/or capturing an iris scan (e.g., a camera and/or the like). In another example, indicator 506C represents a facial scan enabled by a biometric input component/element 326 capable of performing and/or capturing a facial scan (e.g., a camera and/or the like). And in another example, indicator 506D represents a voice sample enabled by a biometric input component/element 326 capable of performing and/or capturing a voice sample (e.g., a microphone and/or the like). As will be recognized, any number and type of biometric inputs can be used, such as a fingerprint scanner, hand print scanner, palm print scanner, microphone for use in voice recognition, camera for use in iris/retina, facial recognition, vein pattern recognition, signature recognition, hand geometry, and/or the like. The biometric input types may also be associated with a priority order. For example, if the user computing entity 30 has eight available biometric input components/elements 326, the authentication computing entity 200 may enforce a priority setting to have the most accurate of the eight biometric inputs used for authentication. For instance, if a fingerprint scan and an iris scan are the most accurate biometric characteristics, the authentication computing entity 200 may require that these be used as two of the inputs for authentication. As will be recognized, a variety of other approaches and techniques can be used to adapt to various needs and circumstances.

Figure 5E:
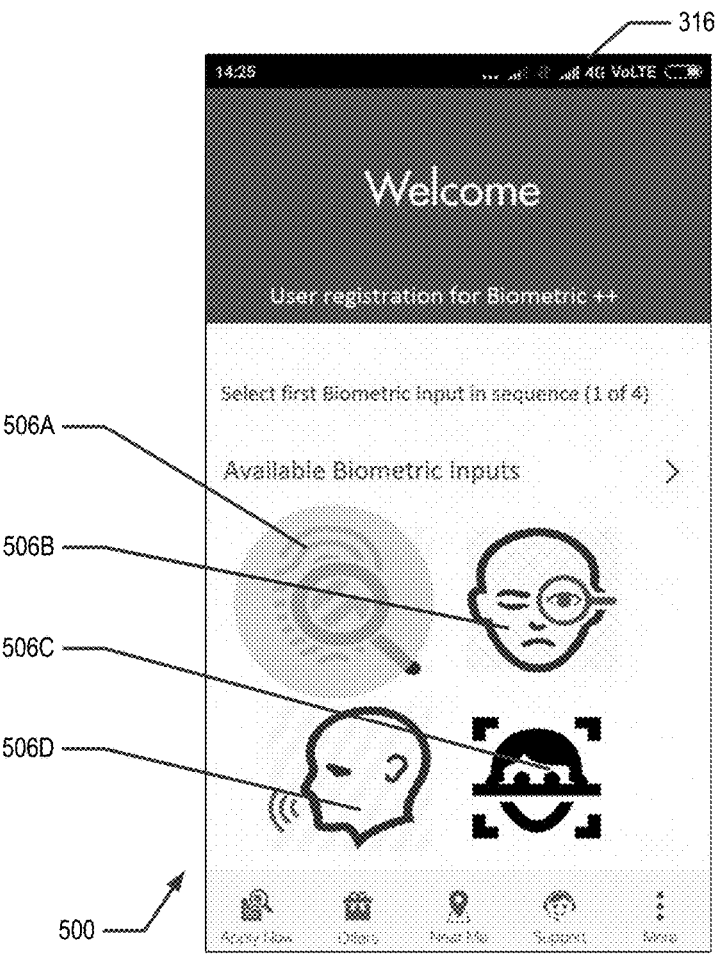
Figure 5F:
Figure 5F:
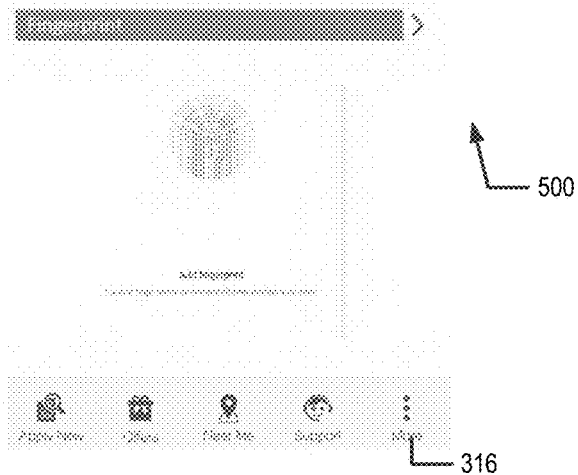

Continuing with FIG. 4, at step/operation 406, the user is prompted to provide a sequence of biometric inputs via the user computing entity 30. For example, the user may be prompted to provide a sequence of N biometric inputs, where N is a predetermined integer greater than one. In various embodiments, the sequence of biometric inputs comprises a plurality biometric inputs wherein each biometric input of the plurality of biometric inputs is associated with a sequence position. For example, each biometric input b is associated with a sequence position i, such that the sequence of biometric inputs is the ordered set $\{b_i | = 1, \ldots, N\}$. In an example embodiment, N is four. For example, an application and/or computer-readable program code operating on the user computing entity 30 and/or authentication computing entity 200 may cause the user interface 500 to display and/or provide an audible prompt for the user to select/enter a first biometric input of a sequence of biometric inputs. At step/operation 408, the biometric inputs are received. In a particular embodiment, the biometric inputs are received in a defined sequence. For example, as shown in FIG. 5E, the user may provide user input selecting one of the indicators 506 (e.g., 506A, 506B, 506C, 506D). The user interface 500 may then provide visual and/or audible instructions for the user to provide a biometric input corresponding to the selected indicator (See FIG. 5F). For example, if the user selects indicator 506A, the user may be instructed (e.g., via one or more user interfaces of the user computing entity 30) to place a finger at a particular position on the user computing entity 30 such that the biometric input component/element 326 that enables fingerprint scans may captured the user's fingerprint. This first received biometric input is associated with the first sequence position and the user is then prompted to select/enter a second biometric input of the sequence by selecting an indicator 506 and providing the corresponding biometric input (See FIGS. 5G and 5H). The second biometric input is then associated with the second sequence position and the user is prompted to select/enter a third biometric input. The process continues until N biometric inputs are received by the user computing entity 30. The type of variation of the N biometric inputs may be enforced at a system level configuration. For example, in one embodiment, the system configuration may require that each of the N biometric inputs be unique. In another embodiment, the system configuration may allow for duplicate inputs if a particular number of biometric inputs is used. For instance, the system could enforce that there must be a minimum of Y distinct biometric inputs in the sequence of X biometric inputs (X>Y). In an embodiment in which a biometric input has already been received and is allowed to be reused, the user interface 500 may provide visual and/or audible instructions that allow the user to select the previously input biometric input as a subsequent input, instead of requiring the user to re-input the same biometric input. As will be recognized, a variety of approaches and techniques can be used to adapt to various needs and circumstances.

In one embodiment, the sequence of biometric inputs may be stored by the user computing entity 30 and/or provided to the authentication computing entity 200 as part of registration. In various embodiments, storing the sequence of inputs is optional based on the variation of authentication approach used.

At step/operation 410, for each biometric input in the sequence of biometric inputs, an appropriate computing entity (e.g., user computing entity 30 or authentication computing entity 200) generates a profile template. For example, the authentication computing entity 200 analyzes and/or processes each biometric input of the sequence of biometric inputs to generate a corresponding profile template. In one embodiment, an appropriate computing entity (e.g., user computing entity 30 or authentication computing entity 200) analyzes, processes, and/or the like each biometric input to extract configurable features. In feature extraction, key features of the biometric inputs selected and/or enhanced. Feature extraction processes and/or algorithms vary depending on the type of biometric input. For example, in feature extraction for a fingerprint, an appropriate computing entity (e.g., user computing entity 30 or authentication computing entity 200) executing a fingerprint feature extraction process or algorithm may locate, measure, and encode ridge edgings and bifurcations in the print. Similarly, in feature extraction for a voice recording, an appropriate computing entity (e.g., user computing entity 30 or authentication computing entity 200) executing a voice feature extraction process or algorithm may filter out particular frequencies and patterns. In iris feature extraction, an appropriate computing entity (e.g., user computing entity 30 or authentication computing entity 200) executing an iris feature extraction process or algorithm may map furrows and striations in the iris. And in facial feature extraction, an appropriate computing entity (e.g., user computing entity 30 or authentication computing entity 200) executing an iris feature extraction process or algorithm may identify particular measurements, like the relative positions of the ears, forehead, cheekbones and nose. The extracted features may comprise a feature vector, such as a minimum feature vector, for each biometric input. Then, each feature vector (e.g., the minimum feature vector) may be stored as a profile template. As described above, feature vectors are digital representations of the key characteristics of an input. In an example embodiment, the profile feature vector is a minimum positive feature vector (e.g., the minimum number of features required to have a positive match). Because a biometric match might not be an exact match, the minimum feature vector defines a measure of similarity at which a match may be declared positive.

In an example embodiment, each profile template may also comprise and/or be associated with a sequence position that is equal to and/or the same as the sequence position associated with the biometric input sequence from which the profile template was generated. For example, a profile template generated based on a biometric input of the sequence of biometric inputs associated with the third sequence position is associated with the third sequence position. Continuing with the above example where N is four, a first profile template, a second profile template, a third profile template, and a fourth profile template are generated using feature extraction. In one embodiment, copies of each template may be stored remotely by the authentication computing entity 200 and/or locally by the user computing entity 30.

FIG. 6 provides a flowchart illustrating example steps, processes, procedures, and/or operations for generating a profile token based on the sequence of biometric inputs and storing the same in a profile token object. In that regard, at step/operation 602, an appropriate computing entity (e.g., user computing entity 30 or authentication computing entity 200) can apply a function (e.g., hashing function, encoding, encryption, cryptographic algorithm, and/or the like) to each profile template. This step/operation can be used to add an additional layer of security for the profile templates. As will be recognized, though, step/operation 602 is optional and may be bypassed by proceeding to step/operation 604.

In step/operation 604, an appropriate computing entity (e.g., user computing entity 30 or authentication computing entity 200) generates a profile string from the profile templates by concatenating the digital representations of the profile templates or using other approaches. In one embodiment, a string may be a contiguous sequence of symbols or values. The profile string comprises the profile templates ordered in accordance with the sequence positions. At this step/operation, either the profile templates themselves may be concatenated to generate the profile string or the profile templates with a function applied in step/operation 602 may be concatenated to generate the profile string. In an example embodiment wherein N is four, the profile string is generated by concatenating the first profile template, the second profile template, the third profile template, and the fourth profile template in their sequence order. The profile string may also include metadata or supplemental data for each profile template in the string.

In one embodiment, FIG. 6A provides an example profile string 650A. As shown in FIG. 6A, the profile string comprises a first profile template 655A in the first sequence position, a second profile template 655B in the second sequence position, a third profile template 655D in the third sequence position, and a fourth profile template 655E in the fourth sequence position. In other words, the first, second, third, and fourth profile templates 655A, 655B, 655D, 655E have been ordered in accordance with the corresponding sequence positions to generate the profile string 650A. In this example, the profile templates do not have a hashing, encoding, cryptographic function, and/or the like applied to the profile templates. Further, the individual elements of the profile templates (and the authentication templates) can be of varying lengths (as that may be determined by the type of biometric input and minimum positive features).

In an alternative embodiment, FIG. 6B provides example profile string 650B. As shown in FIG. 6B, the profile string comprises a hashed first profile template 665A in the first sequence position, a hashed second profile template 665B in the second sequence position, a hashed third profile template 665D in the third sequence position, and a hashed fourth profile template 665E in the fourth sequence position. The hashed first, second, third, and fourth profile templates 665A, 665B, 665D, 665E have been ordered in accordance with the corresponding sequence positions to generate the profile string 650B. In this example, the profile templates have a hashing, encoding, cryptographic function, and/or the like applied to the individual profile templates. In such an embodiment, this may reduce the templates to individual string lengths (that may or may not have a consistent length).

Continuing with FIG. 6, at step/operation 606, a profile token is generated from the profile string. To generate the profile token, an appropriate computing entity (e.g., user computing entity 30 or authentication computing entity 200) applies a hashing function, a cryptographic algorithm, and/or the like to the profile string 650A or 650B. This may be the same function applied to each profile template in optional step/operation 602 or a different function. In either case, the profile string is provided as an input to a hashing function, a cryptographic algorithm, and/or the like—with the output being the profile token. In various embodiments, the profile token encodes and/or encrypts the profile string. As will be recognized, similar to step/operation 602, step/operation 606 is optional and may be bypassed.

Figure 5I:
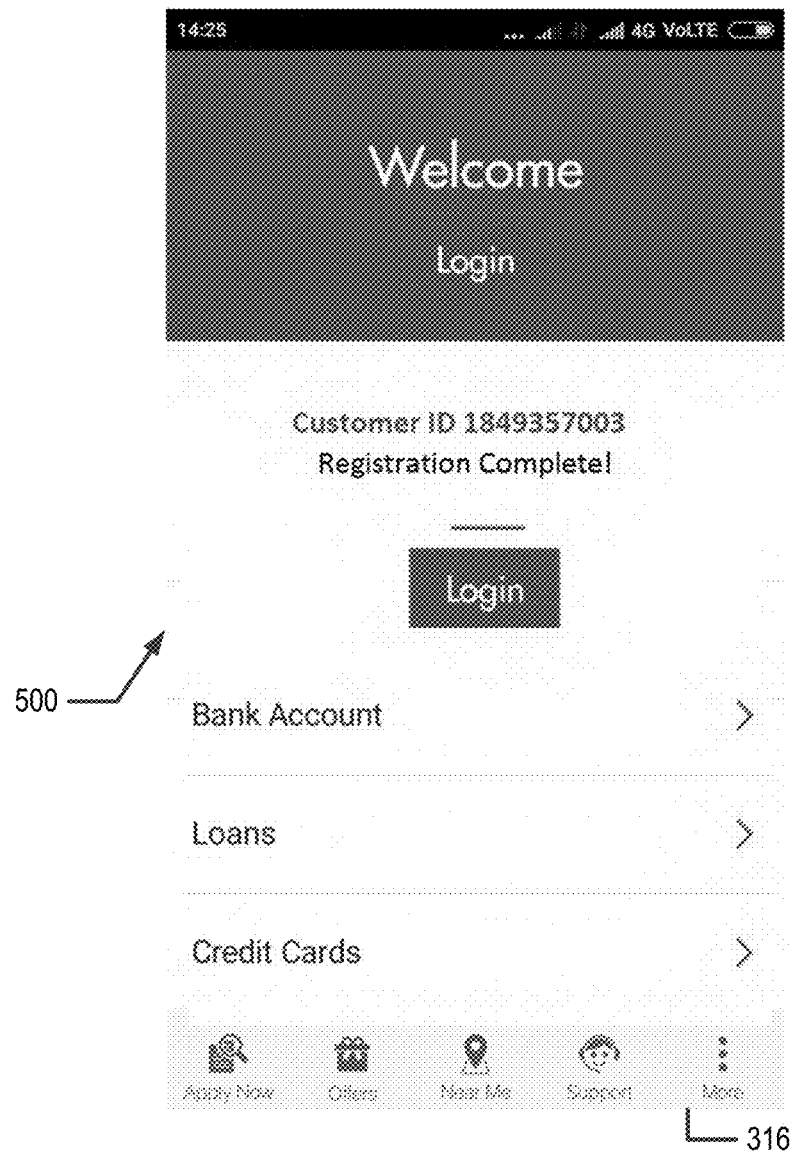

The profile token can then be stored by the authentication computing entity 200 in association with the user profile for the user. In an example embodiment, a profile token object is a data object and/or data structure comprising the profile token. The profile token object is associated with the user identifier and/or stored as part of and/or in association with the user profile corresponding to the user identifier. The user is now registered for biometric authentication. FIG. 5I shows a registration complete indication via the user interface 500.

b. Exemplary Authentication Process

After a user has registered to use the biometric token-based authentication, the user may be authenticated using the sequence of biometric inputs to gain access to information/data, content, applications, functions, and/or the like in accordance with the permissions associated with the user profile. FIG. 7 provides a flowchart illustrating example steps, processes, procedures, and/or operations for authenticating a user using a sequence of biometric inputs (e.g., a biometric combination token/code).

Figure 8A:
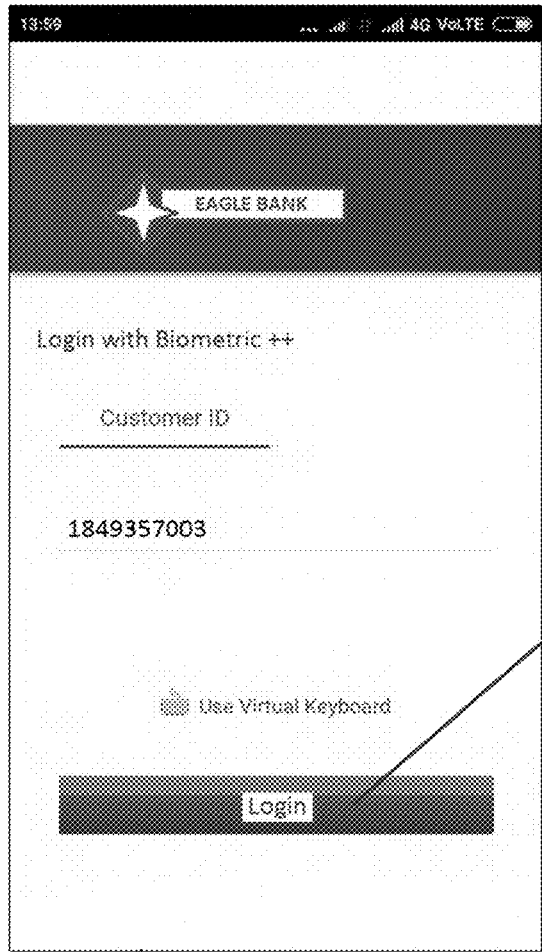

Starting at step/operation 702, a request for user authentication is received. For example, a user operating a user computing entity 30 may request to be authenticated (e.g., to log in) and the authentication request may be provided by the user computing entity 30 such that the authentication computing entity 200 receives the authentication request. For example, as shown in FIG. 8A, a user may access a user interface 800 and/or the like via the user computing entity 30, enter a user identifier (e.g., via keypad/keyboard 318), and select a selectable submission indicator 808 (e.g., icon, image, menu, button, graphic, and/or the like). The user selection of the selectable submission indicator 808 may cause the user computing entity 30 to receive the authentication request. The authentication request may be associated with and/or comprise the user identifier (e.g., 1849357003 of FIG. 8A).

At step/operation 704, responsive to receiving the authentication request, an application and/or computer-readable code installed and/or operating on the user computing entity 30 may determine/identify the biometric input components/elements 326 of the user computing entity 30. As will be recognized, the user computing entity 30 used for registration may be different than the user computing entity 30 used for authentication. In an example embodiment, an application and/or computer-readable code installed and/or operating on the authentication computing entity 200 may interact with the user computing entity 30 via an API to determine the biometric input components/elements 326 of the user computing entity 30. In another embodiment, a device profile (e.g., using a device identifier) of the user computing entity 30 may be accessed to provide information/data identifying the biometric input components/elements 326 of the user computing entity 30. In these examples, the authentication computing entity 200 receives the information/data identifying the biometric input components/elements 326 of the user computing entity 30. For example, it may be determined that the user computing entity 30 has a fingerprint scanner, a microphone for capturing a voice sample, a camera capable of performing an iris and/or facial scan, and/or other biometric input component/element 326.

Figure 8B:
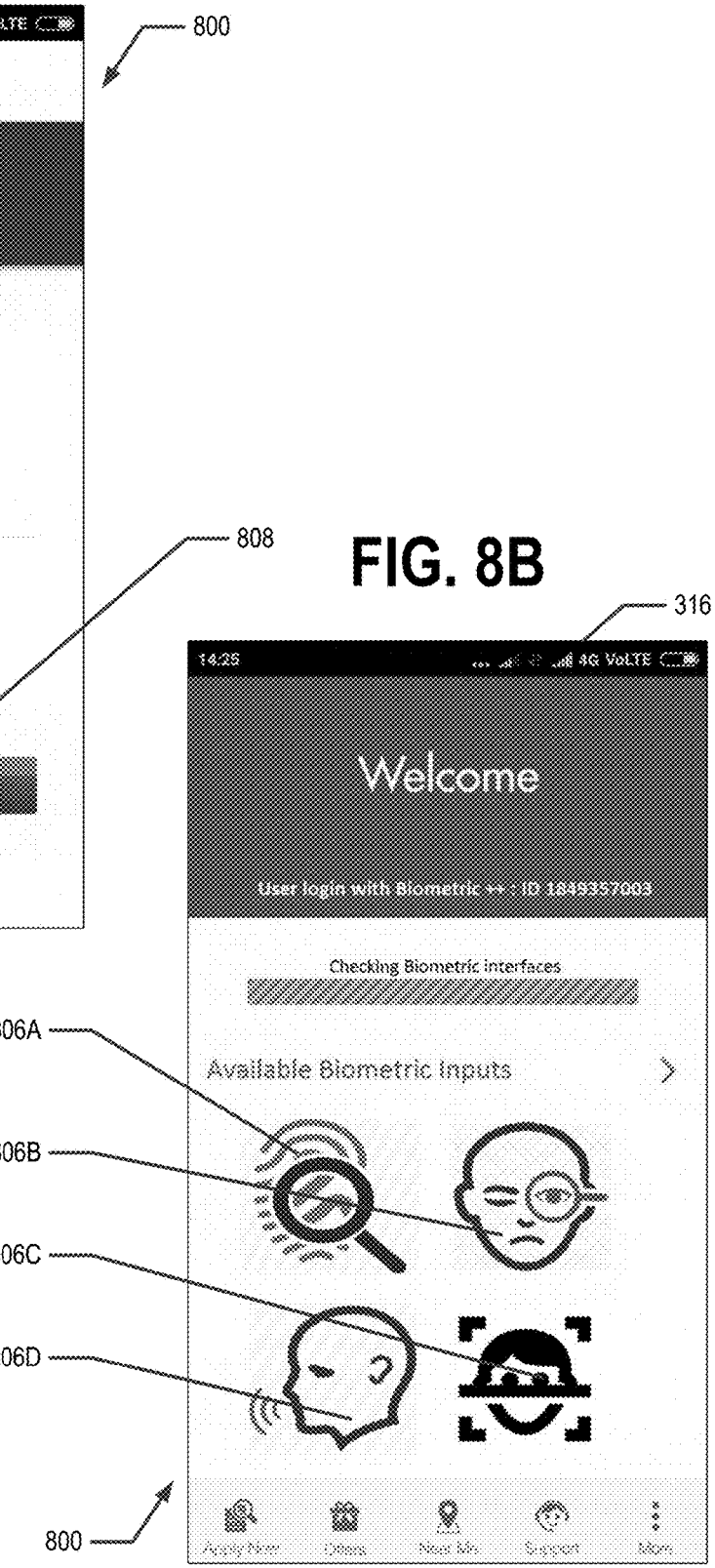

FIG. 8B illustrates an example view of the user interface 800 as the biometric input components/elements 326 of the user computing entity 30 are being determined and/or checked. For example, an indicator 806 (e.g., 806A, 806B, 806C, 806D) may be displayed via the user interface 500 (a) for each identified biometric input component/element 326, (b) for each type of biometric input for which a corresponding biometric input component/element 326 has been determined/identified, and/or (c) for each identified biometric input that is required to authenticate the user. For example, indicator 806A represents a fingerprint scan enabled by a biometric input component/element 326 capable of performing and/or capturing a fingerprint scan. In another example, indicator 806B represents an iris scan enabled by a biometric input component/element 326 capable of performing and/or capturing an iris scan (e.g., a camera and/or the like). In another example, indicator 806C represents a facial scan enabled by a biometric input component/element 326 capable of performing and/or capturing a facial scan (e.g., a camera and/or the like). In another example, indicator 806D represents a voice sample enabled by a biometric input component/element 326 capable of performing and/or capturing a voice sample (e.g., a microphone and/or the like).

Figure 8C:
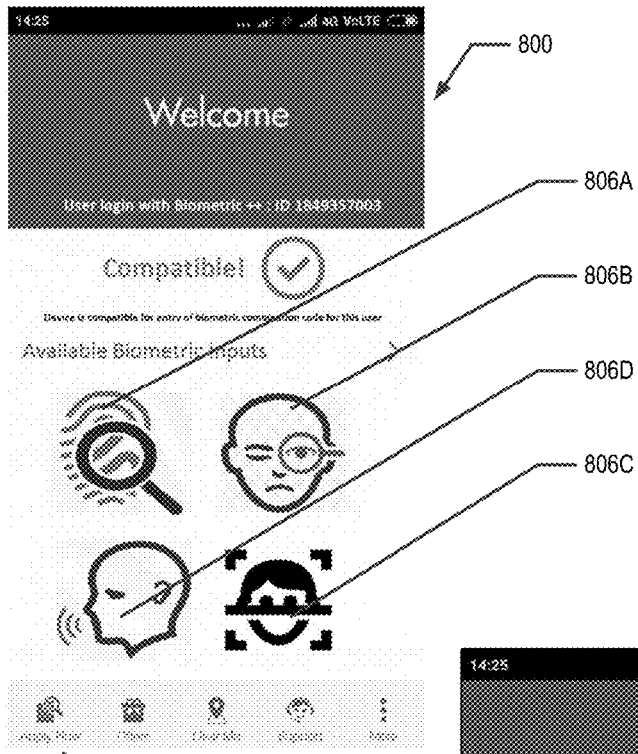

As shown in FIG. 8C, responsive to a determination that the user computing entity 30 has the necessary biometric input components/elements 326 for the user's biometric sequence, the user interface 800 can cause display of a compatibility success view and allow the biometric authentication to proceed. Otherwise, the user interface 800 can cause display of a compatibility fail view and not allow biometric authentication to proceed (not shown).

Figure 8D:
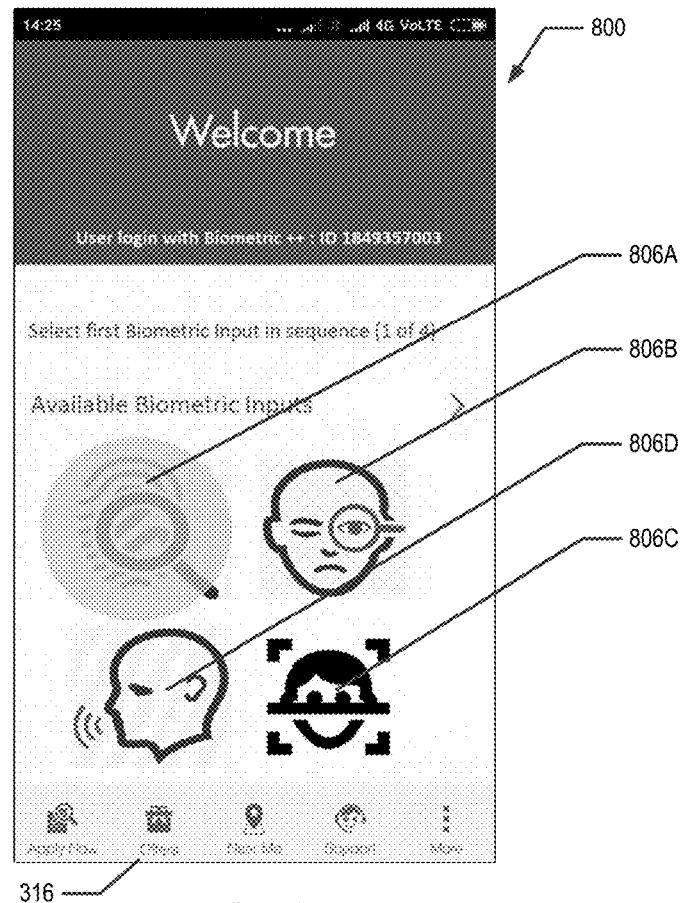
Figure 8E:
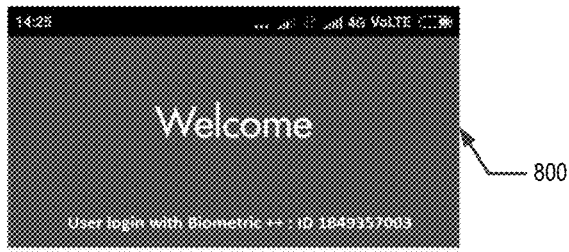
Figure 8E:
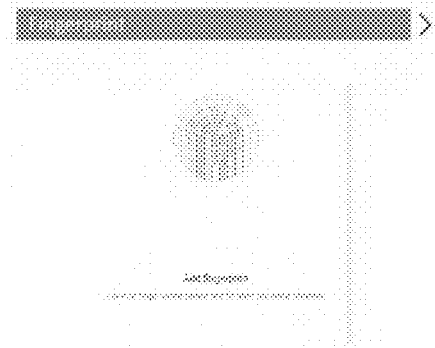

Continuing with FIG. 7, at step/operation 706, the user is prompted to provide an input sequence of biometric inputs via the user computing entity 30 (see FIG. 8E). For example, the user may be prompted to provide an input sequence of N biometric inputs that corresponds to the sequence of biometric inputs provided during the registration process. For example, an application and/or computer-readable program code operating on the user computing entity 30 and/or authentication computing entity 200 may cause the user interface 800 to display and/or provide a visual and/or audible prompt for the user to select/enter an input sequence of biometric inputs corresponding to the sequence of biometric inputs provided during the registration process. In one embodiment, the user may be expected to remember the sequence of biometric inputs and provide the biometric inputs in the same order as during the registration process. In another embodiment, the user may be prompted to follow the sequence of biometric inputs (e.g., FIG. 8D).

Figure 8F:
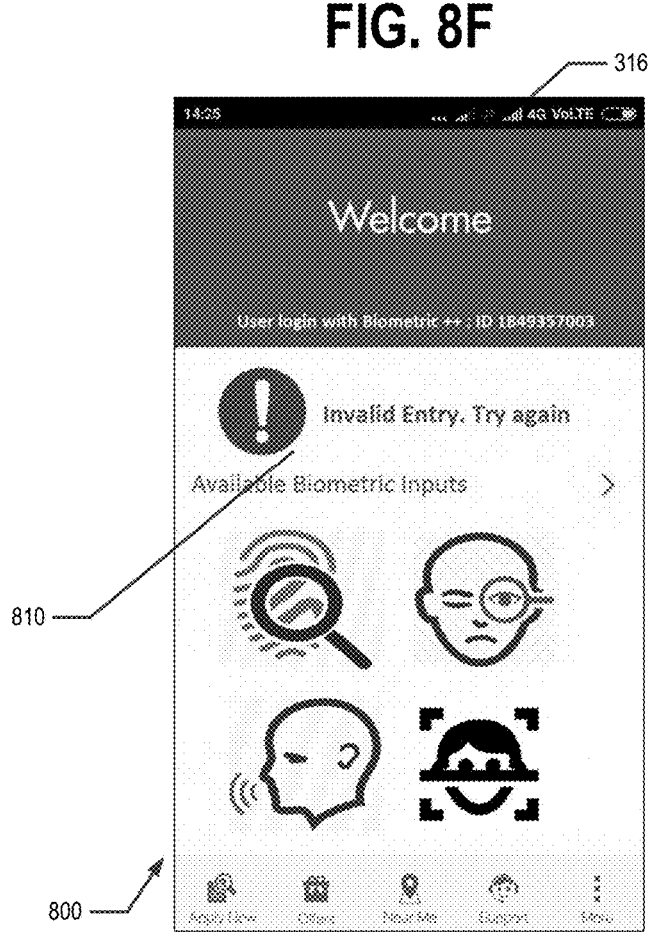
Figure 8H:
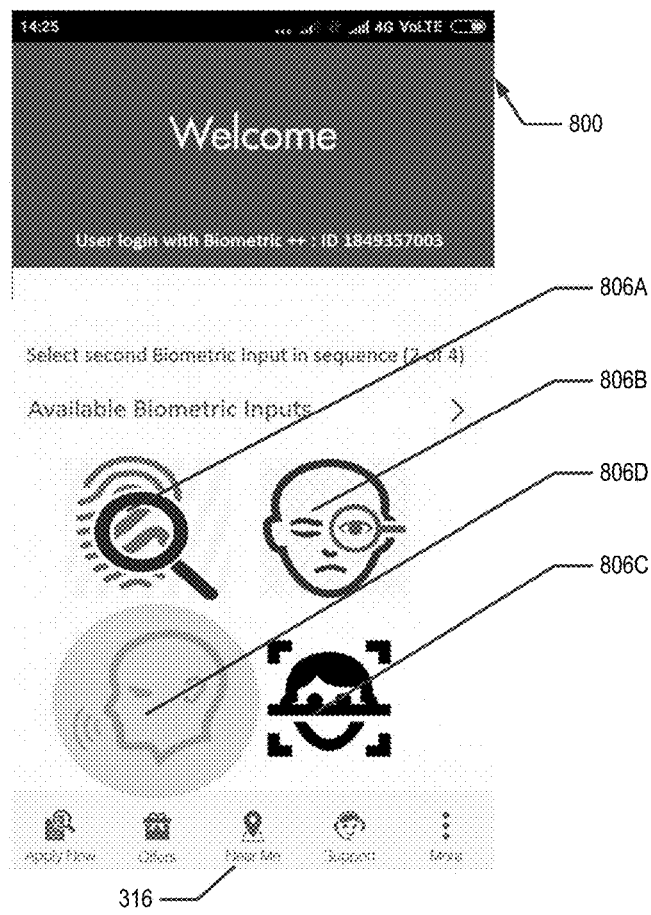

At step/operation 708, each biometric input is received in sequence (see FIGS. 8D, 8H, and 8I). For example, as shown in FIG. 8D, the user may provide user input corresponding to the highlighted indicators 806 (e.g., 806A, 806B, 806C, 806D). For example, as a first input, the user may be instructed (e.g., via one or more user interfaces of the user computing entity 30 highlighting the appropriate input) to place a finger at a particular position on the user computing entity 30 such that the biometric input component/element 326 that enables fingerprint scans to capture the user's fingerprint (see highlighted element 806A). For each biometric input, an appropriate computing entity (e.g., user computing entity 30 or authentication computing entity 200) analyzes, processes, and/or the like the biometric input to extract features. In extracting features, the appropriate computing entity (e.g., user computing entity 30 or authentication computing entity 200) may extract a feature vector (e.g., a minimum feature vector) and may store the same as an authentication template. Each authentication template may also comprise and/or be associated with a sequence position that is equal to and/or the same as the sequence position associated with the biometric input from which the authentication template was generated. For example, an authentication template generated based on a biometric input of the sequence of biometric inputs associated with the first sequence position is associated with the first sequence position. Continuing with the above example where N is four, in iteratively receiving each biometric input and confirming a corresponding match, a first authentication template, a second authentication template, a third authentication template, and a fourth authentication template are generated. In one embodiment, copies of each template may be stored by the authentication computing entity 200 and/or the user computing entity 30.

Each template (e.g., minimum feature vector) may be locally or remotely compared to the corresponding profile template (e.g., steps/operations 708, 710, 711, and 712). This process iterates until all biometric inputs have been individually verified. In the present example, the first profile template and the first authentication template will be compared to determine if there is a match with sufficient similarity. To make such a determination, an appropriate computing entity (e.g., user computing entity 30 or authentication computing entity 200) may determine if the template pair (corresponding profile template and authentication template) satisfies a first similarity threshold requirement. For instance, the first authentication template is compared to the first profile template to determine a similarity score based on the minimum positive feature vectors in each template. The first similarity threshold requirement may require that the similarity score indicate that the authentication feature vector and the profile feature vector satisfy a similarity score (e.g., 60% similar) to be considered a match. A similar process is iteratively implemented to determine if each biometric input of the input sequence (e.g., each authentication templates) matches the corresponding profile templates. Thus, each authentication template is individually matched in sequence to a corresponding profile template before proceeding to the next biometric input.

If a match that satisfies the similarity threshold requirement does not exist for a particular biometric input, an error is generated (step/operation 711 and FIG. 8F). In that regard, the user computing entity 30 may provide a visual or audible error alert/notification to the user (e.g., via the display 316 and/or other output device). For example, FIG. 8F illustrates an example view of a user interface 800 displaying an error alert/notification 810. For example, the error alert/notification 810 may inform the user that the authentication cannot be performed using the provided input. The user may then attempt to provide a correct biometric input or sequence of biometric inputs again. If the user makes more than a predetermined number of unsuccessful attempts, the user profile corresponding to the provided user identifier is locked (see FIG. 8G), in an example embodiment. "Unlocking" the biometric authentication process may require an administrative override. Once all N biometric inputs have been iteratively received, had features extracted, templates generated, and been confirmed as a match with the corresponding profile template, the biometric authentication process proceeds to step/operation 714.

At steps/operations 714, 716, and 718, an authentication token is generated based on the authentication templates corresponding to the biometric inputs of the input sequence. To do so, an appropriate computing entity (e.g., user computing entity 30 or authentication computing entity 200) may apply a function (e.g., hashing function, encoding, encryption, cryptographic algorithm, and/or the like) to each authentication template if optional step/operation 602 was executed. This would necessarily be the same hashing function, encoding, encryption, cryptographic algorithm, and/or the like that was applied for optional step/operation 602. In this regard, steps/operations 714 and 718 are only performed if steps/operations 602, 606 were respectively performed.

In one embodiment for step/operation 716, an appropriate computing entity (e.g., user computing entity 30 or authentication computing entity 200) generates an authentication string from the authentication templates by concatenating the digital representations of the authentication templates or using other approaches. In an example embodiment, the authentication string comprises the authentication templates ordered in accordance with their input sequence positions. At this step/operation, either the authentication templates themselves may be concatenated to generate the authentication string or the authentication templates with a function applied in step/operation 714 may be concatenated to generate the authentication string. In an embodiment in which N is four, the authentication string is generated by concatenating the first authentication template, the second authentication template, the third authentication template, and the fourth authentication template in their sequence order. The authentication string may also include metadata or supplemental data for each authentication template in the string. In another embodiment for step/operation 716, an appropriate computing entity (e.g., user computing entity 30 or authentication computing entity 200) generates an authentication string from the profile templates stored locally by concatenating the digital representations of the profile templates or using other approaches.

In one embodiment, FIG. 7A provides an example authentication string 750A. As shown in FIG. 7A, the authentication string 750A comprises a first authentication template 755A in the first sequence position, a second authentication template 755B in the second sequence position, a third authentication template 755D in the third sequence position, and a fourth authentication template 755E in the fourth sequence position. The first, second, third, and fourth authentication templates 755A, 755B, 755D, 755E have been ordered in accordance with the corresponding sequence positions to generate the authentication string 750A. In this example, the authentication templates do not have a hashing, encoding, cryptographic function, and/or the like applied to the authentication templates.

FIG. 7B provides example authentication string 750B in which optional step/operation 714 was performed. As shown in FIG. 7B, the authentication string 750B comprises a hashed first authentication template 765A in the first sequence position, a hashed second authentication template 765B in the second sequence position, a hashed third authentication template 765D in the third sequence position, and a hashed fourth authentication template 765E in the fourth sequence position. The hashed first, second, third, and fourth authentication templates 765A, 765B, 765D, 765E have been ordered in accordance with the corresponding sequence positions to generate the authentication string 750B. In this example, the authentication templates have a hashing, encoding, cryptographic function, and/or the like applied to the individual authentication templates.

Continuing with FIG. 7, at step/operation 718, an authentication token is generated from the authentication string 750A or 750B. To generate the authentication token, an appropriate computing entity (e.g., user computing entity 30 or authentication computing entity 200) applies a hashing function, a cryptographic algorithm, and/or the like to the authentication string 750A or 750B. This may be the same function applied to each profile string in step/operation 606. The authentication string is provided as an input to a hashing function, a cryptographic algorithm, and/or the like—with the output being the authentication token. In various embodiments, the authentication token encodes and/or encrypts the authentication string.

The authentication token can then be stored by an appropriate computing entity in an authentication token object. In an example embodiment, the authentication token object is a data object and/or data structure comprising the authentication token. In one embodiment, storing may be primarily for logging/audit trail purposes and/or authentication token generation.

At step/operation 720, an appropriate computing entity determines whether the authentication token matches the profile token corresponding to the user identifier associated with the authentication request. For example, the authentication computing entity 200 may access the profile corresponding to the provided user identifier and access the profile token therefrom and/or use the user identifier as an index for accessing the profile authentication template from a database and/or other data store (which may be an encrypted database and/or other data store in various embodiments). An appropriate computing entity may then determine if the authentication token matches the profile token. In an example embodiment, the authentication token is considered to match the profile token if the authentication token satisfies a second similarity threshold requirement. A token match verifies the proper biometric input sequence, the proper biometric inputs, and the proper conversion of the same into tokens.

If it is determined that the authentication token does not match the profile token, the process continues to step/operation 722. If it is determined that the authentication token does match the profile token, the process continues to step/operation 724.

Figure 8G:
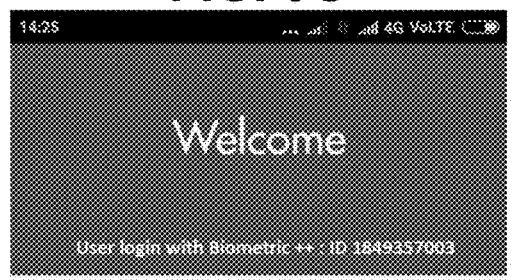
Figure 8G:
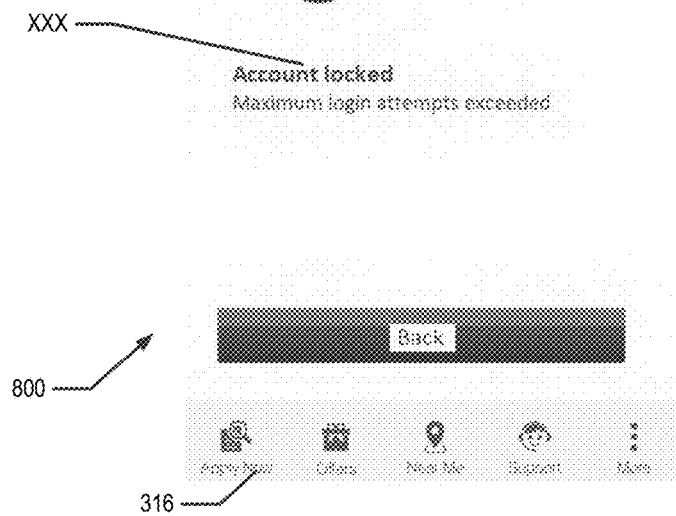

At step/operation 722, an error alert/notification is provided. For example, the authentication computing entity 200 may provide an error alert/notification such that the user computing entity 30 receives the error alert/notification. In response to receiving and/or processing the error alert/notification, the user computing entity 30 may provide a visual or audible error alert/notification to the user (e.g., via the display 316 and/or other output device). For example, FIG. 8F illustrates an example view of a user interface 800 displaying an error alert/notification 810 for an invalid input, and similar error alert/notification can be provided at step/operation 722. Similarly, FIG. 8G illustrates an example view of a user interface 800 displaying an error alert/notification 810 for exceeding a set number of invalid inputs, and similar error alert/notification can be provided at step/operation 722. The error alert/notification 810 may inform the user that the authentication cannot be performed using the provided input sequence of biometric inputs. The user may then attempt to provide a correct input sequence of biometric inputs again. If the user makes more than a predetermined number of unsuccessful attempts, the user profile corresponding to the provided user identifier is locked, in an example embodiment-similar to the user interface 800 in FIG. 8G.

At step/operation 724, the user operating the user computing entity 30 is authenticated (see FIG. 8J). For example the authentication computing entity 200 may authenticate the user operating the user computing entity 30. In an example embodiment, the authentication of the user operating the user computing entity 30 may enable the user computing entity 30 to access information/data, content, applications, functions, and/or the like from the authentication computing entity 200 and/or one or more content computing entities 40 in accordance with the permissions associated with the user profile corresponding to the user identifier associated with the authentication request.

c. Alternative Embodiments

As will be recognized, various alternative embodiments may be used in addition to those described with regards to FIGS. 4, 5A, 5B, 5C, 5D, 5E, 5F, 5G, 5H, 5I, 6, 6A, 7, 7A, 7B, 8A, 8B, 8C, 8D, 8E, 8F, 8G, 8H, 8I, and 8J.

i. First Exemplary Alternative Embodiment

In a first alternative embodiment, profile tokens and authentication tokens are not used. Rather, the profile templates and authentication templates are used for registration and authentication. For example, for registration, the steps/operations of FIG. 4 are performed to generate and store profile templates. However, the steps/operations of FIG. 6 are not performed—a profile token is not generated. And for authentication, steps/operations 702, 704, 706, 708, 710, 711, and 712 are performed (steps/operations 714, 716, 718, and 720 are not performed, so an authentication token is not generated). If all registration templates and authentication templates match, step/operation 724 is performed. Otherwise, step/operation 722 is performed.

ii. Second Exemplary Alternative Embodiment

In a second alternative embodiment, during the registration process, the profile templates are generated, but the specific registration sequence of the inputs used to generate the profile templates is not saved. Furthermore, there may be multiple profile templates associated with a single input type (e.g., a left thumbprint and right forefinger print may both be associated with a type of "fingerprint," a right iris print and a left iris print may both be associated with a type of "iris print," or a left palm print and a right palm print may both be associated with a type of "palm print"). In this embodiment, a corresponding profile template may be determined based on input type and not registration sequence position. If there are multiple profile templates of the same type, one may be selected based on a secondary consideration, i.e., the first to satisfy a similarity threshold requirement, or the one that best satisfies the similarity threshold requirement. In such an embodiment, in steps/operations 604 and 716, the order of the profile templates in the concatenations may reflect the order in which the biometric inputs were received for authentication. Alternatively, the order of the templates in the concatenations can be enforced by a system level configuration that corresponds to an order established at registration time, e.g., a received sequence order, a hierarchical order, a priority order, a default order, a numerical order, and/or the like.

iii. Third Exemplary Alternative Embodiment

In a third alternative embodiment, profile templates and authentication templates are only stored (such as in a cache as opposed to a persistent state) and used to generate a profile token. In such an embodiment, the profile templates are temporarily stored and used to generate a profile token. After creation of the profile token, the profile templates are discarded. The order of the profile templates in the concatenation to generate the profile token (step/operation 604) can be enforced by a system level configuration based on a received sequence order, a hierarchical order, a priority order, a default order, a numerical order, and/or the like.

Similarly, for authentication, the authentication templates are temporarily stored (such as in a cache as opposed to a persistent state) and used to generate an authentication token. After creation of the authentication token, the authentication templates are discarded. The order of the authentication templates in the concatenation to generate the authentication token (step/operation 716) can be enforced by a system level configuration based on a received sequence order, a hierarchical order, a priority order, a default order, a numerical order, and/or the like.

In this embodiment, steps/operations 710 and 711 are not performed, and step/operation 708 iterates through step/operation 712 until the last input is received. In one embodiment, the matching of the profile token and the authentication token may require an exact match in a theoretical lossless, errorless system. However, in another embodiment, to compensate for losses and fluctuations in biometric inputs and subsequent token generation, the system may generate and evaluate the profile token and the authentication token based on a probability or threshold using an acceptable degree of difference, variation, tolerance, and/or the like. As will be recognized, a variety of other approaches and techniques can be used to adapt to various needs and circumstances.

d. Technical Advantages

Various embodiments provide technical solutions to technical problems arising in the field of user authentication. For example, various embodiments address the technical problem of improving user authentication that provides for more efficient user authentication than with just individual biometric authentication (e.g., a lower false negative rate) and provides for improved security and ease of use than with password/passcode/PIN authentication. For example, the biometric token-based authentication process has the improved security of a biometric authentication process but with a lower false negative rate. Instead of requiring high accuracy for a single biometric input, by using multiple biometric inputs, the individual accuracy thresholds can be lowered to reduce the false rejection rates. For instance, in a standard system, a single biometric authentication may require an 80% accuracy match to be authenticated. However, using a biometric token generated from multiple biometric inputs, the accuracy match for each input may be lowered to, for example, a 60% accuracy match for each input because multiple inputs are verified. In other words, the multiple biometric inputs compensate for the need to retain a high threshold for accuracy. In other words, the threshold requirements for matching can be lower than traditional biometric authentication processes. However, due to the use of the profile token and the authentication token generated from multiple biometric inputs, the security of the biometric token-based authentication is still maintained and increased. Thus, various embodiments provide an improvement to authentication technology.

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for authenticating a user operating a user computing entity, the method comprising:
receiving, by one or more processors, a first biometric input of an ordered sequence of biometric inputs from the user operating the user computing entity;
extracting, by the one or more processors, features of the first biometric input to generate a first authentication template, wherein the first authentication template comprises a first minimum positive feature vector;
receiving, by the one or more processors, a second biometric input of the ordered sequence of biometric inputs;
extracting, by the one or more processors, features of the second biometric input to generate a second authentication template, wherein the second authentication template comprises a second minimum positive feature vector;
determining, by the one or more processors, that (a) the first authentication template matches a first profile template and (b) the second authentication template matches a second profile template;
generating, by the one or more processors, an authentication string by at least one of (a) concatenating the first authentication template and the second authentication template, or (b) concatenating the first profile template and the second profile template;
generating, by the one or more processors, an authentication token by applying a first function to the authentication string; and
transmitting, by the one or more processors, the authentication token to an authentication server.

2. The method of claim 1 further comprises:
receiving, by the authentication server, the authentication token;
determining, by the authentication server, that the authentication token matches a profile token associated with the user; and
responsive to determining that the authentication token matches the profile token, authenticating, by the authentication server, the user.

3. The method of claim 2, wherein determining whether the authentication token matches the profile token comprises determining whether the authentication token and the profile token satisfy a similarity threshold.

4. The method of claim 1, wherein the first authentication template and the second authentication template have had a second function applied before being concatenated.

5. The method of claim 4, wherein (a) the first function is a cryptographic function, and (b) the second function is the cryptographic function.

6. The method of claim 1, wherein the first profile template is the first in an ordered sequence of profile templates and the second profile template is the second in the ordered sequence of profile templates.

7. The method of claim 1, wherein the biometric inputs are selected from the group consisting of fingerprint input, hand print input, palm print input, voice input, iris input, facial input, vein input, and signature input.

8. The method of claim 1 further comprising:
providing an indication via a user interface to the user to input the first biometric input; and
providing an indication via the user interface to the user to input the second biometric input.

9. The method of claim 1, wherein determining that the first authentication template matches the first profile template comprises satisfying a similarity threshold requirement, and wherein determining that the second authentication matches the second profile comprises satisfying the similarity threshold requirement.

10. The method of claim 9, wherein the first biometric input is associated with a first input type, the second biometric input is associated a second input type, the first profile template is selected from one or more profile templates associated with the first input type, and the second profile template is selected from one or more profile templates associated with the second input type.

11. The method of claim 10, wherein the first profile template is selected from the one or more profile templates associated with the first input type based at least in part on the first profile template being the first or the best of the one or more profile templates associated with the first input type to satisfy the similarity threshold requirement, and wherein the second profile template is selected from the one or more profile templates associated with the second input type based at least in part on the second profile template being the first or the best of the one or more profile templates associated with the second input type to satisfy the similarity threshold requirement.

12. The method of claim 11, wherein being the best to satisfy the similarity threshold requirement comprises exceeding the similarity threshold requirement the most.

13. A system comprising at least one processor and at least one memory including program code, the at least one memory and the program code configured to, with the processor, cause the system to at least:
receive a first biometric input of an ordered sequence of biometric inputs from the user operating the apparatus;
extract features of the first biometric input to generate a first authentication template, wherein the first authentication template comprises a first minimum positive feature vector;
receive a second biometric input of the ordered sequence of biometric inputs;
extract features of the second biometric input to generate a second authentication template, wherein the second authentication template comprises a second minimum positive feature vector;
determine that (a) the first authentication template matches a first profile template and (b) the second authentication template matches a second profile template;
generate an authentication string by at least one of (a) concatenating the first authentication template and the second authentication template, or (b) concatenating the first profile template and the second profile template;
generate an authentication token by applying a first function to the authentication string; and
transmit the authentication token to an authentication server.

14. The system of claim 13, wherein the memory and program code are further configured to, with the processor, cause the system to:
receive the authentication token;
determine that the authentication token matches a profile token associated with the user; and
responsive to determining that the authentication token matches the profile token, authenticate the user.

15. The system of claim 14, wherein determining whether the authentication token matches the profile token comprises determining whether the authentication token and the profile token satisfy a similarity threshold.

16. The system of claim 13, wherein the first authentication template and the second authentication template have had a second function applied before being concatenated.

17. The system of claim 16, wherein (a) the first function is a cryptographic function, and (b) the second function is the cryptographic function.

18. The system of claim 13, wherein the first profile template is the first in an ordered sequence of profile templates and the second profile template is the second in the ordered sequence of profile templates.

19. The system of claim 13, wherein the biometric inputs are selected from the group consisting of fingerprint input, hand print input, palm print input, voice input, iris input, facial input, vein input, and signature input.

20. The system of claim 13, wherein the memory and program code are further configured to, with the processor, cause the system to:
provide an indication via a user interface to the user to input the first biometric input; and
provide an indication via the user interface to the user to input the second biometric input.

21. The system of claim 13, wherein determining that the first authentication template matches the first profile template comprises satisfying a similarity threshold requirement, and wherein determining that the second authentication matches the second profile comprises satisfying the similarity threshold requirement.

22. The system of claim 21, wherein the first biometric input is associated with a first input type, the second biometric input is associated a second input type, the first profile template is selected from one or more profile templates associated with the first input type, and the second profile template is selected from one or more profile templates associated with the second input type.

23. The system of claim 22, wherein the first profile template is selected from the one or more profile templates associated with the first input type based at least in part on the first profile template being the first or the best of the one or more profile templates associated with the first input type to satisfy the similarity threshold requirement, and wherein the second profile template is selected from the one or more profile templates associated with the second input type based at least in part on the second profile template being the first or the best of the one or more profile templates associated with the second input type to satisfy the similarity threshold requirement.

24. The system of claim 23, wherein being the best to satisfy the similarity threshold requirement comprises exceeding the similarity threshold requirement the most.

25. A computer program product for authenticating a user operating a user computing entity, the computer program product comprising at least one non-transitory computer-readable storage medium having computer-readable program code portions stored therein, the computer-readable program code portions comprising:
an executable portion configured to receive a first biometric input of an ordered sequence of biometric inputs from the user operating the apparatus;
an executable portion configured to extract features of the first biometric input to generate a first authentication template, wherein the first authentication template comprises a first minimum positive feature vector;
an executable portion configured to receive a second biometric input of the ordered sequence of biometric inputs;
an executable portion configured to extract features of the second biometric input to generate a second authentication template, wherein the second authentication template comprises a second minimum positive feature vector;
an executable portion configured to determine that (a) the first authentication template matches a first profile template and (b) the second authentication template matches a second profile template;
an executable portion configured to generate an authentication string by at least one of (a) concatenating the first authentication template and the second authentication template, or (b) concatenating the first profile template and the second profile template;
an executable portion configured to generate an authentication token by applying a first function to the authentication string; and
an executable portion configured to transmit the authentication token to an authentication server.

26. The computer program product of claim 25 further comprising:
an executable portion configured to receive the authentication token;
an executable portion configured to determine that the authentication token matches a profile token associated with the user; and
an executable portion configured to, responsive to determining that the authentication token matches the profile token, authenticate the user.

27. The computer program product of claim 26, wherein determining whether the authentication token matches the profile token comprises determining whether the authentication token and the profile token satisfy a similarity threshold.

28. The computer program product of claim 25, wherein the first authentication template and the second authentication template have had a second function applied before being concatenated.

29. The computer program product of claim 28, wherein (a) the first function is a cryptographic function, and (b) the second function is the cryptographic function.

30. The computer program product of claim 29, wherein the first profile template is the first in an ordered sequence of profile templates and the second profile template is the second in the ordered sequence of profile templates.

31. The computer program product of claim 25, wherein the biometric inputs are selected from the group consisting of fingerprint input, hand print input, palm print input, voice input, iris input, facial input, vein input, and signature input.

32. The computer program product of claim 25 further comprising:
an executable portion configured to provide an indication via a user interface to the user to input the first biometric input; and
an executable portion configured to provide an indication via the user interface to the user to input the second biometric input.

33. The computer program product of claim 25, wherein determining that the first authentication template matches the first profile template comprises satisfying a similarity threshold requirement, and wherein determining that the second authentication matches the second profile comprises satisfying the similarity threshold requirement.

34. The computer program product of claim 33, wherein the first biometric input is associated with a first input type, the second biometric input is associated a second input type, the first profile template is selected from one or more profile templates associated with the first input type, and the second profile template is selected from one or more profile templates associated with the second input type.

35. The computer program product of claim 34, wherein the first profile template is selected from the one or more profile templates associated with the first input type based at least in part on the first profile template being the first or the best of the one or more profile templates associated with the first input type to satisfy the similarity threshold requirement, and wherein the second profile template is selected from the one or more profile templates associated with the second input type based at least in part on the second profile template being the first or the best of the one or more profile templates associated with the second input type to satisfy the similarity threshold requirement.

36. The computer program product of claim 35, wherein being the best to satisfy the similarity threshold requirement comprises exceeding the similarity threshold requirement the most.

\* \* \* \* \*